(12) United States Patent
Kouno et al.

(10) Patent No.: US 10,340,849 B2
(45) Date of Patent: Jul. 2, 2019

(54) DIAGNOSIS SYSTEM AND DIAGNOSIS METHOD FOR PHOTOVOLTAIC POWER GENERATION SYSTEM

(71) Applicant: HITACHI, LTD., Chiyoda-ku, Tokyo (JP)

(72) Inventors: Toru Kouno, Tokyo (JP); Hideyuki Shitanishi, Tokyo (JP); Masahito Toyosaki, Tokyo (JP); Tetsuharu Ohya, Tokyo (JP); Kenichi Gokita, Tokyo (JP); Tomoharu Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 288 days.

(21) Appl. No.: 15/378,717

(22) Filed: Dec. 14, 2016

(65) Prior Publication Data
US 2017/0170781 A1    Jun. 15, 2017

(30) Foreign Application Priority Data

Dec. 15, 2015  (JP) ................................ 2015-244009

(51) Int. Cl.
*H02S 50/10* (2014.01)
*G01W 1/12* (2006.01)
(Continued)

(52) U.S. Cl.
CPC ............... *H02S 50/10* (2014.12); *G01W 1/12* (2013.01); *H02S 40/32* (2014.12); *H02S 40/34* (2014.12); *H02S 40/36* (2014.12)

(58) Field of Classification Search
CPC .......... H02S 50/00; H02S 50/10; H02S 40/32; H02S 40/34; H02S 40/36; G01W 1/12
See application file for complete search history.

(56) References Cited

U.S. PATENT DOCUMENTS

| | | | |
|---|---|---|---|
| 2011/0210610 A1* | 9/2011 | Mitsuoka .......... | H01L 31/02021 307/51 |
| 2012/0242303 A1* | 9/2012 | Ishii .................... | G05F 1/67 323/234 |

(Continued)

FOREIGN PATENT DOCUMENTS

| | | |
|---|---|---|
| JP | 2011-187807 A | 9/2011 |
| JP | 2015-136233 A | 7/2015 |

*Primary Examiner* — Sujoy K Kundu
*Assistant Examiner* — Lynda Dinh
(74) *Attorney, Agent, or Firm* — Miles & Stockbridge PC

(57) ABSTRACT

A diagnosis system including: a power collection unit configured to couple a plurality of photovoltaic cell arrays, each including photovoltaic cells, in parallel; a control unit; and a monitoring unit, the monitoring unit being configured to: estimate a solar radiation amount and an operating temperature of the photovoltaic cell arrays based on the current value measured by a first ammeter in the control unit and the voltage value measured by the first voltmeter in the control unit by using an expression expressing a relationship between the solar radiation amount, the operating temperature, and a number of photovoltaic cells, and an output current; correct the estimated values so as to match the current values measured by second ammeters in the power collection unit by using the expression; and calculate a theoretical current value of each of the photovoltaic cell arrays based on the corrected values by using the expression.

14 Claims, 16 Drawing Sheets

(51) Int. Cl.
*H02S 40/34* (2014.01)
*H02S 40/36* (2014.01)
*H02S 40/32* (2014.01)

(56) References Cited

U.S. PATENT DOCUMENTS

| | | |
|---|---|---|
| 2012/0299576 A1 | 11/2012 | Kasai et al. |
| 2014/0077608 A1* | 3/2014 | Nosaka .................... G05F 1/67 |
| | | 307/77 |
| 2015/0094967 A1* | 4/2015 | Kouno .................... H02S 50/00 |
| | | 702/58 |

* cited by examiner

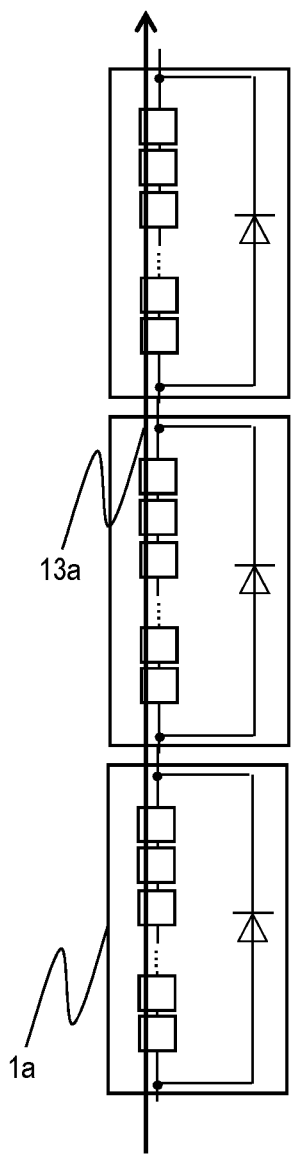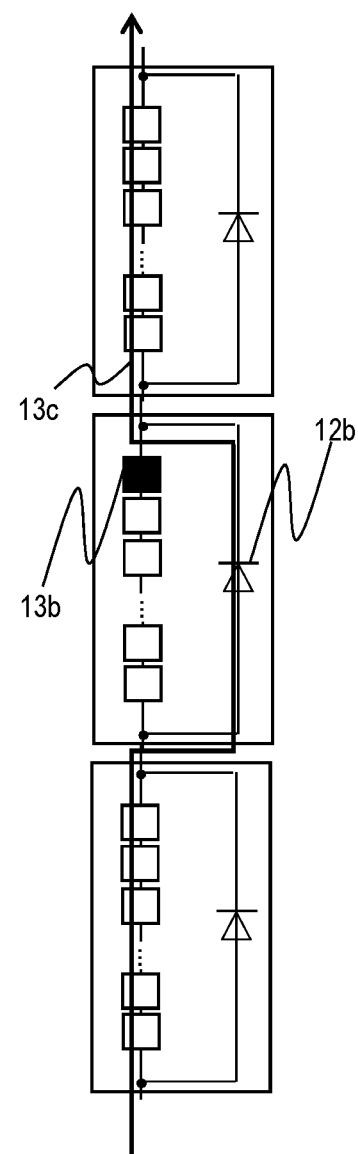
*Fig. 3A*  *Fig. 3B*

DIAGNOSIS RESULT

| POWER COLLECTION NO. | DIAGNOSIS DATE AND TIME | THEORETICAL CURRENT [A] | MEASURED CURRENT [A] | FAILURE LOSS [%] | FIVE-SECOND DATA DISPLAY |
|---|---|---|---|---|---|
| 101 | SEPTEMBER 30, 2015 10:10:00 | | | 0.00 | ·DISPLAY |
| 2 | SEPTEMBER 30, 2015 10:10:00 | | | 3.00 | ·DISPLAY |
| 3 | SEPTEMBER 30, 2015 10:10:10 | | | 0.00 | ·DISPLAY |
| 4 | SEPTEMBER 30, 2015 10:10:10 | | | 0.00 | |
| ... | | ... | | | ... |
| N | SEPTEMBER 30, 2015 10:10:10 | | | 0.00 | ·DISPLAY |

Fig. 16A

DIAGNOSIS SYSTEM AND DIAGNOSIS METHOD FOR PHOTOVOLTAIC POWER GENERATION SYSTEM

CLAIM OF PRIORITY

The present application claims priority from Japanese patent application JP2015-244009 filed on Dec. 15, 2015, the content of which is hereby incorporated by reference into this application.

BACKGROUND OF THE INVENTION

This invention relates to a technology for diagnosing a failure based on a measurement value obtained by a power collector in a photovoltaic power generation system including a large number of photovoltaic cell modules.

Regarding a failure diagnosis for a photovoltaic power generation system, there exist technologies disclosed in JP 2011-187807 A and JP 2015-136233 A.

The following photovoltaic power generation system is disclosed in JP 2011-187807 A. Specifically, the photovoltaic power generation system includes a plurality of photovoltaic cell strings 8, each being formed by coupling in series photovoltaic cell modules 1, each being configured to generate DC power by light irradiation, and a junction box 2 to which the DC power generated by each of the plurality of photovoltaic cell strings is input. The junction box includes: a plurality of current detectors 10, each being configured to detect a total current value obtained by adding positive values being currents flowing through some of the photovoltaic cell strings and negative values being currents flowing through the remaining photovoltaic cell strings; a measurement apparatus 11 configured to measure the total current value detected by the current detector for each of the current detectors; and a data transmission apparatus 12 configured to transmit the current values measured by the measurement apparatus.

The following photovoltaic power generation system is disclosed in JP 2015-136233 A. Specifically, the photovoltaic power generation system includes: a photovoltaic cell string formed by coupling a plurality of photovoltaic cell modules; a junction box to which a plurality of the photovoltaic cell strings are coupled; a power collection apparatus configured to collect power of the junction box; a plurality of current detectors provided to the junction box and/or the power collection apparatus, each being configured to detect a current value per input unit; and a temperature detector configured to detect a temperature of an atmosphere in which the current detectors are provided. The current values detected by the current detectors are corrected based on the temperature detected by the temperature detector.

SUMMARY OF THE INVENTION

In a large-scale photovoltaic power generation system as represented by a mega solar power generation system, operation control such as regular maintenance and a quick response to a failure is required for stable power generation over a long period of time. The photovoltaic power generation system includes a current sensor configured to measure a current of a photovoltaic cell string formed by coupling in series the plurality of photovoltaic cell modules or a total current of a plurality of the photovoltaic cell strings. The measured current is displayed on a monitoring screen. An electric power provider or a maintenance worker determines based on the current value whether or not the photovoltaic power generation system has an abnormality. In recent years during which construction costs of the photovoltaic power generation system are dropping, it is common to measure the total current of the plurality of photovoltaic cell strings. The current sensor is generally installed in equipment called a power collection box or a power collection rack (hereinafter referred to as "power collection rack") in which wirings from the plurality of photovoltaic cell strings are grouped together.

In order to diagnose the photovoltaic power generation system by using the total current of the plurality of photovoltaic cell strings, a method of determining a failure by comparing a plurality of the total currents is disclosed in JP 2011-187807 A. Specifically, the currents with the negative values are detected by winding the wirings of some of the photovoltaic cell strings so that a current value is obtained by adding the currents with the negative values to the currents with the positive values of the remaining photovoltaic cell strings. The plurality of total currents are compared with each other to determine the failure. In JP 2015-136233 A, a method of measuring a temperature of the power collection rack to correct decrease in accuracy due to the temperature of the current sensor is disclosed.

According to the technologies disclosed in JP 2011-187807 A and JP 2015-136233 A, the current is measured by the current sensor installed inside the power collection rack. Measurement accuracy of the current sensor inside the power collection rack varies depending on a temperature inside the power collection rack. The wirings from the plurality of strings are also grouped together in the power collection rack, and therefore an internal temperature distribution is large. Thus, even when the temperature sensor is arranged inside the power collection rack, it is difficult to precisely measure a temperature in the periphery of the current sensor. Further, it is necessary to set a cutoff frequency of a low-pass filter low so as to remove measurement noise. Therefore, it is common to set a sampling speed lower by one to two orders of magnitude for the photovoltaic power generation system to be controlled by a switching operation at several kilohertz. Thus, it is difficult to determine a failure from the plurality of photovoltaic cell strings based on the current measurement value obtained by the sampling described above.

In view of the circumstances described above, this invention has an object to set a failure determination criterion with high accuracy that is prevented from being affected by a temperature fluctuation and insufficient sampling by using a current sensor installed in a power collection box or a power collection rack of a large-scale photovoltaic power generation system.

In order to solve at least one of the foregoing problems, there is provided a diagnosis system for a photovoltaic power generation system, comprising: a power collection unit configured to couple a plurality of photovoltaic cell arrays, each including a plurality of photovoltaic cells, in parallel; a control unit coupled to the power collection unit; and a monitoring unit configured to diagnose the photovoltaic power generation system, the control unit comprising: a first current measurement apparatus configured to measure a current of the plurality of photovoltaic cell arrays input from the power collection unit; and a first voltage measurement apparatus configured to measure a voltage of the plurality of photovoltaic cell arrays input from the power collection unit, the control unit being configured to control a current and a voltage to be output so that power becomes maximum based on a current value measured by the first current measurement apparatus and a voltage value measured by the first voltage measurement apparatus, the power collection unit comprising a plurality of second current measurement apparatus respectively configured to measure currents of the plurality of photovoltaic cell arrays, the monitoring unit comprising: a storage unit configured to hold the current value measured by the first current measurement apparatus, the voltage value measured by the first voltage measurement apparatus, and current values measured by the plurality of second current measurement apparatus; and a computing unit coupled to the storage unit, the computing unit being configured to: estimate a solar radiation amount and an operating temperature of the plurality of photovoltaic cell arrays based on the current value measured by the first current measurement apparatus and the voltage value measured by the first voltage measurement apparatus by using an expression expressing a relationship between the solar radiation amount, the operating temperature, and a number of photovoltaic cells, and an output current; correct the estimated solar radiation amount and the estimated operating temperature to values matching the current values measured by the plurality of second current measurement apparatus based on the current value measured by the first current measurement apparatus and the current values measured by the plurality of second current measurement apparatus by using the expression; and calculate a theoretical value of the current of each of the plurality of photovoltaic cell arrays based on the corrected solar radiation amount and the corrected operating temperature by using the expression.

According to the one embodiment of this invention, a failure of a photovoltaic cell module present in a plurality of photovoltaic cell strings can be detected with high accuracy in the photovoltaic power generation system.

BRIEF DESCRIPTION OF THE DRAWINGS

FIG. 3A and FIG. 3B are explanatory diagrams of a current path when a failure occurs in the photovoltaic cell module according to the first embodiment of this invention.

FIG. 16A and FIG. 16B are explanatory diagrams of an example of a screen displayed in the photovoltaic power generation system according to the second embodiment of this invention.

DETAILED DESCRIPTION OF THE PREFERRED EMBODIMENTS

Figure 1:
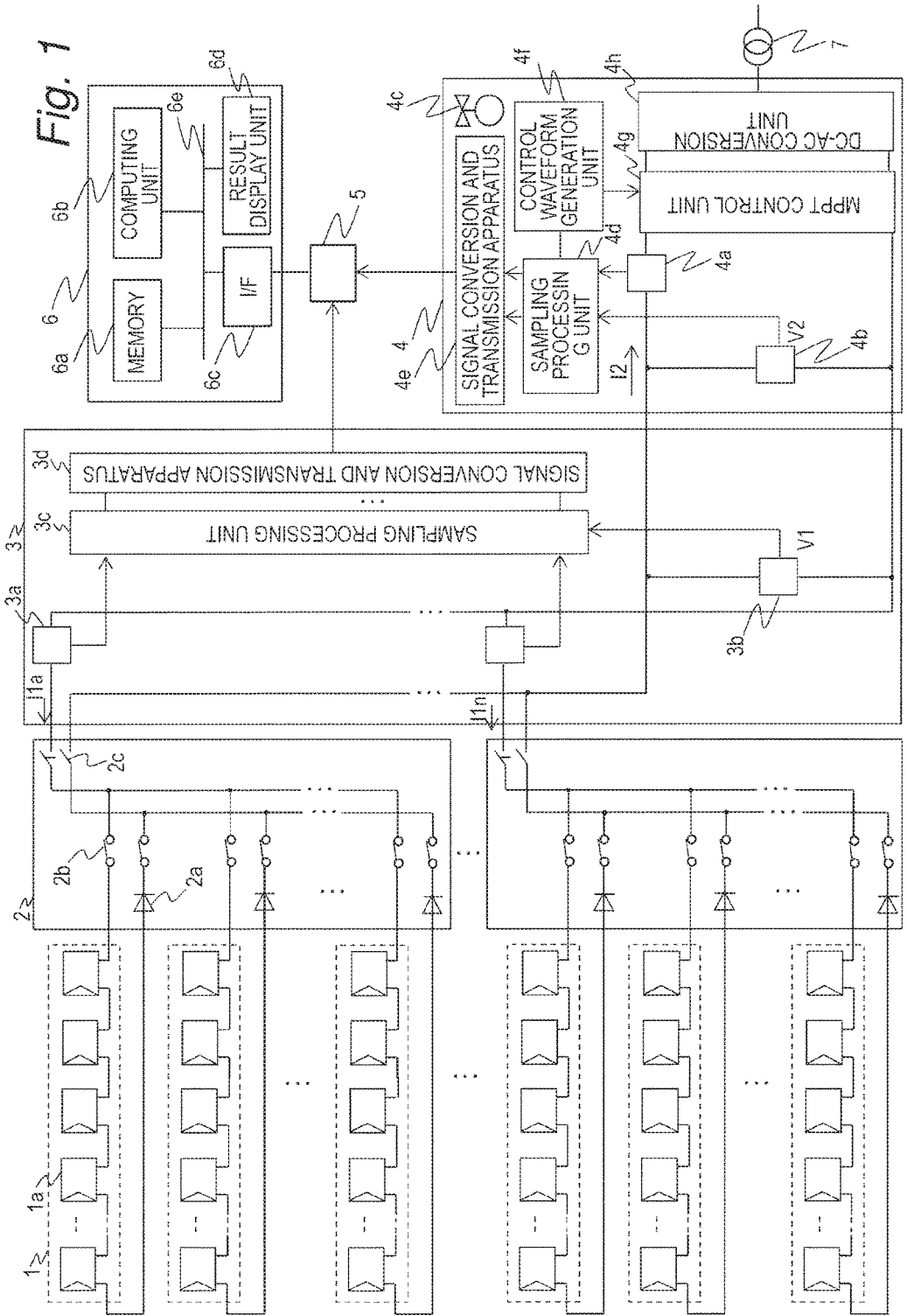
FIG. 1 is a block diagram for illustrating a configuration of a photovoltaic power generation system according to a first embodiment of this invention.

In the following, various embodiments of this invention are described referring to the drawings.

First Embodiment

In a first embodiment of this invention, the following method of diagnosing a failure of a photovoltaic cell string is described. Specifically, a predicted solar radiation amount and a predicted temperature are calculated from an operating current and an operating voltage measured in a power conditioner. The calculated predicted solar radiation amount and predicted temperature are converted into values to be used for a current sensor. A theoretical current under conditions of the converted predicted solar radiation amount and predicted temperature and a current measured by the current sensor are compared with each other. Based on a ratio of the theoretical current and real power, a failure of a photovoltaic cell string is diagnosed. Prior to the description of the embodiments, a photovoltaic power generation system to which the embodiments are applied and a factor of decrease in measurement accuracy are first described.

FIG. 1 is a block diagram for illustrating a configuration of a photovoltaic power generation system according to the first embodiment of this invention.

The photovoltaic power generation system includes photovoltaic cell strings 1, each being formed by coupling a plurality of photovoltaic cell modules 1a in series, junction boxes 2, each being configured to bundle a plurality of the photovoltaic cell strings 1, a power collection rack 3 in which the plurality of junction boxes 2 are bundled, a power conditioner 4 to which a current bundled by the power collection rack 3 is input, a transmission path 5, and a monitoring apparatus 6.

In the following description, a photovoltaic cell string group including all the photovoltaic cell strings 1 finally bundled by the single power collection rack 3 (specifically, with outputs controlled by the single power conditioner 4) is mainly described as "photovoltaic cell array". However, a photovoltaic cell string group bundled by the single junction box 2 can also be referred to as "partial photovoltaic cell array".

Backflow prevention diodes 2a configured to prevent backflow of a current into the photovoltaic cell strings, and fuses 2b and breakers 2c configured to shut off a current path in case of flow of a large current are mounted to each of the junction boxes 2. The power collection rack 3 includes a plurality of current measurement apparatus 3a, each being configured to measure a sum of DC currents flowing from the plurality of photovoltaic cell strings bundled in a corresponding one of the junction boxes 2, and a voltage measurement apparatus 3b configured to measure a DC voltage. The measured DC currents and DC voltage are subjected to sampling processing in a sampling processing unit 3c. Then, after being subjected to parallel-to-serial conversion in a signal conversion and transmission apparatus 3d, a signal obtained by the parallel-to-serial conversion is transmitted to the transmission path 5.

The power conditioner 4 includes a current measurement apparatus 4a, a voltage measurement apparatus 4b configured to measure a DC voltage, an MPPT control unit 4g configured to perform maximum power point tracking (MPPT) control, and a DC-AC conversion unit 4h. The DC current measured by the DC measurement apparatus 4a and the DC voltage measured by the voltage measurement apparatus 4b are subjected to sampling processing in a sampling processing unit 4d so as to be transmitted to a control waveform generation unit 4f and a signal conversion and transmission apparatus 4e. Signals transmitted to the control waveform generation unit 4f are used to generate a command signal for the MPPT control. The MPPT control unit 4g is configured to control the current and the voltage so that maximum power can be extracted from a large number of the photovoltaic cell string groups grouped together in the power collection rack 3. The DC voltage boosted or bucked in the MPPT control unit 4g and the DC current are converted into an AC voltage and an AC current by the DC-AC conversion unit 4h to be interconnected to a system. Meanwhile, similarly to the signals from the power collection rack 3, the signals transmitted from the sampling processing unit 4d to the signal conversion and transmission apparatus 4e are subjected to parallel-to-serial conversion in the signal conversion and transmission apparatus 4e and are then transmitted to the transmission path 5. Further, it is common to install a cooler 4c in the power conditioner 4 so as to keep an internal temperature constant.

The transmission path 5 may be any form of transmission path, for example, a transmission apparatus such as a power line communication (PLC) or the Internet. Information of the DC currents and the DC voltage measured by a plurality of the power collection racks 3 and the DC current and the DC voltage measured by the power conditioner 4 is grouped together in the monitoring apparatus 6 via the transmission path 5.

The monitoring apparatus 6 includes a memory 6a, a computing unit 6b, an interface 6c, and a result display unit 6d, which are mutually coupled to one another through an internal bus 6e. The memory 6a is a main storage apparatus, e.g., a semiconductor storage apparatus. Power generation information including the currents and the voltages transmitted from the power collection rack 3 and the power conditioner 4 are held in the memory 6a included in the monitoring apparatus 6 via the interface 6c and the internal bus 6e. Although not illustrated in FIG. 1, the monitoring apparatus 6 may further include an auxiliary storage apparatus coupled to the internal bus 6e, which is configured to store the above-mentioned power generation information and the like as needed. The computing unit 6b is a computing apparatus configured to diagnose a failure based on the power generation information stored in the memory 6a, and is, for example, a central processing unit (CPU) configured to execute failure diagnosis processing in accordance with a program stored in the memory 6a. The result display unit 6d is a display apparatus configured to display, for example, a character and a graphic, and is configured to display a result of the failure diagnosis executed by the computing unit 6b.

Figure 2:
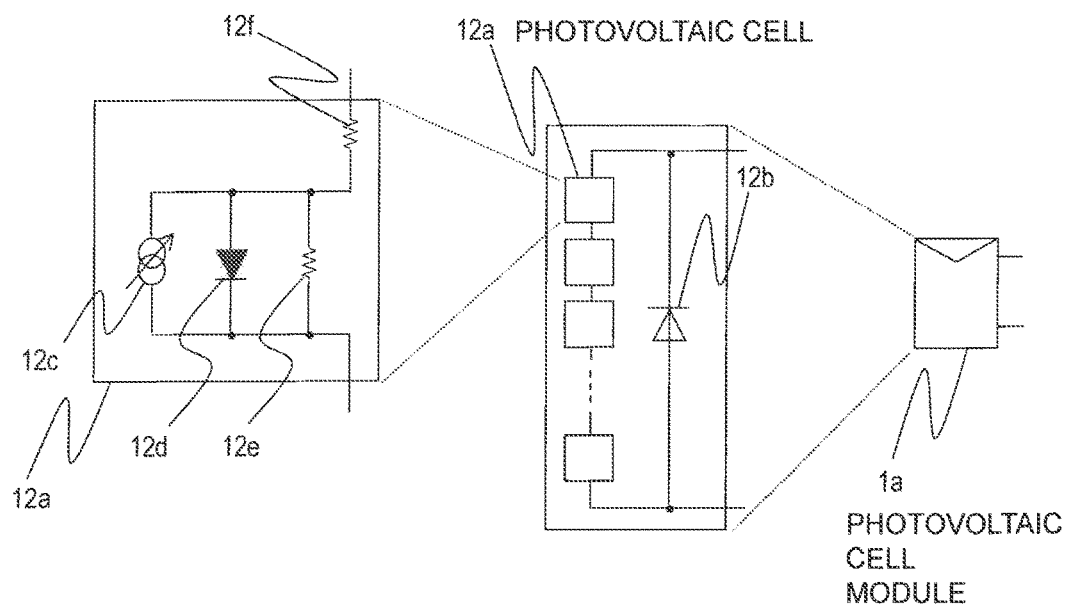
FIG. 2 is an explanatory diagram for illustrating an equivalent circuit of a photovoltaic cell module in the photovoltaic power generation system according to the first embodiment of this invention.

FIG. 2 is an explanatory diagram for illustrating an equivalent circuit of the photovoltaic cell module in the photovoltaic power generation system according to the first embodiment of this invention.

The photovoltaic cell module 1a can be represented as a plurality of photovoltaic cells 12a coupled in series, which is partitioned by a bypass diode 12b coupled in parallel to the plurality of photovoltaic cells 12a. Each of the photovoltaic cells 12a can be represented as an equivalent circuit including a current source 12c, a pn-junction diode 12d, a shunt resistor 12e, and a series resistor 12f. A current proportional to a solar radiation amount is supplied from the current source 12c.

FIG. 3A and FIG. 3B are explanatory diagrams of a current path when a failure occurs in the photovoltaic cell module according to the first embodiment of this invention.

A current path of the photovoltaic cell module with no failure in any of the photovoltaic cells passes through the photovoltaic cells coupled in series as in the case of a current path 13a illustrated in FIG. 3A. For example, when a failure occurs in a photovoltaic cell 13b as illustrated in FIG. 3B, the current path 13a is changed to a current path 13c that passes through the bypass diode 12b of the photovoltaic cell module without passing through the plurality of photovoltaic cells including the failed photovoltaic cell 13b in the photovoltaic cell module.

When the failure occurs in the single photovoltaic cell 13b, the current passes through the bypass diode 12b and therefore does not pass through all the photovoltaic cells in the photovoltaic cell module as illustrated in FIG. 3B. Specifically, all the photovoltaic cells do not contribute to photovoltaic power generation. Therefore, all the photovoltaic cells in the photovoltaic cell module are treated as being failed in the following description.

Figure 4:
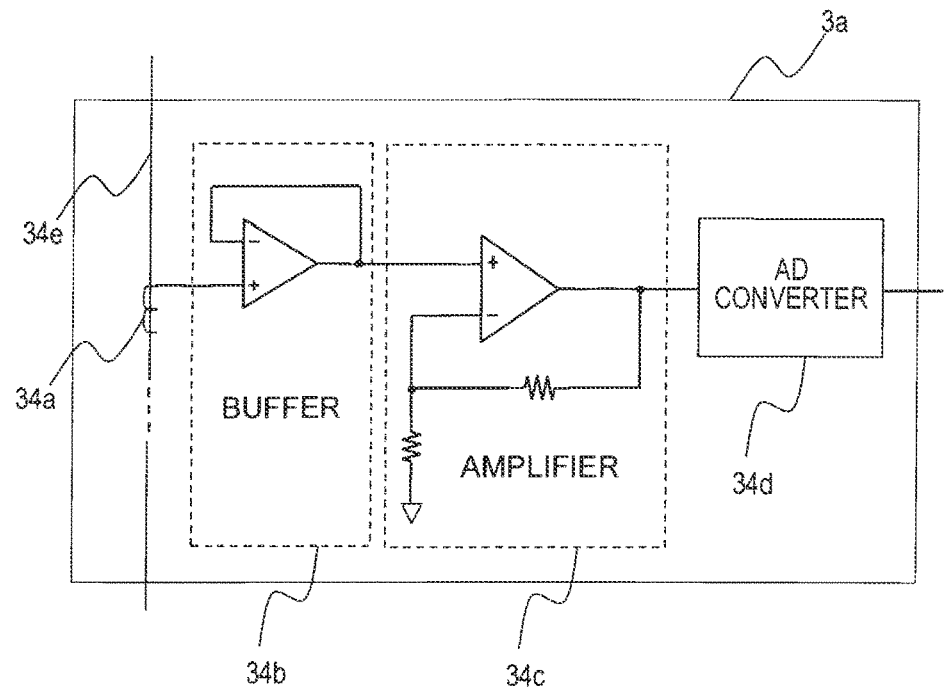
FIG. 4 is an explanatory diagram for illustrating an example of a current measurement apparatus according to the first embodiment of this invention.

FIG. 4 is an explanatory diagram for illustrating an example of the current measurement apparatus 3a according to the first embodiment of this invention.

The current measurement apparatus 3a includes a current transformer (CT) sensor 34a, a buffer 34b, a non-inverting amplifier circuit 34c, and an analog-digital (AD) converter 34d. A current flowing through an electric wire 34e is converted into a voltage by the CT sensor 34a. The converted voltage is subjected to impedance conversion through the buffer 34b. Then, the voltage signal is amplified by using the non-inverting amplifier circuit 34c to a level processable by the AD converter 34d. A low-pass filter (not shown) is installed at an input of the AD converter 34d. Through the low-pass filter, a ripple component and noise of a high frequency component are removed from the voltage signal so that the voltage signal is converted into a digital value with ensured measurement accuracy.

Although the current measurement apparatus 4a is similar to the current measurement apparatus 3a illustrated in FIG. 4, a range of a measurable current may be different. Thus, linearity of the current measurement apparatus 3a and that of the current measurement apparatus 4a may be different from each other as described later.

Figure 5:
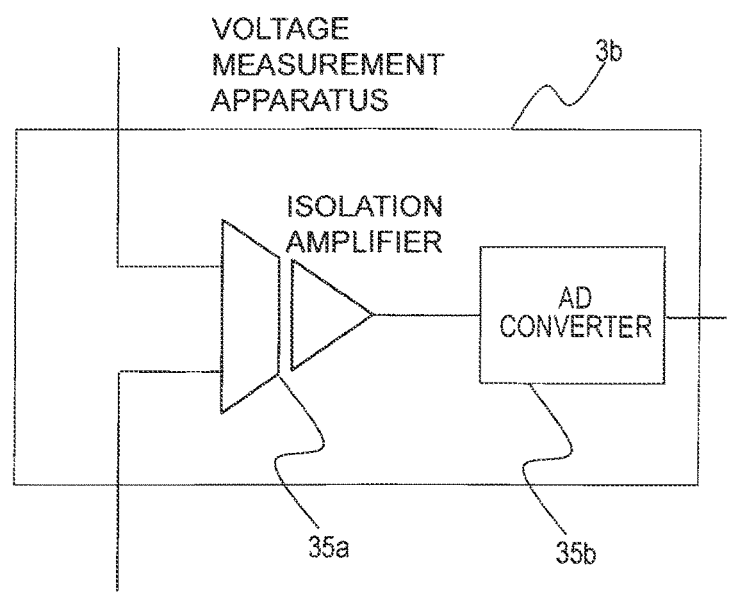
FIG. 5 is an explanatory diagram for illustrating an example of a voltage measurement apparatus according to the first embodiment of this invention.

FIG. 5 is an explanatory diagram for illustrating an example of the voltage measurement apparatus 3b according to the first embodiment of this invention.

The voltage measurement apparatus 3b includes an isolation amplifier 35a and an AD converter 35b. The isolation amplifier 35a is configured to attenuate the voltage signal to a level processable by the AD converter 35b. The attenuated voltage signal is converted into a digital signal by the AD converter 35b.

The voltage measurement apparatus 4b is similar to the voltage measurement apparatus 3b, and therefore the description thereof is herein omitted.

Figure 6A:
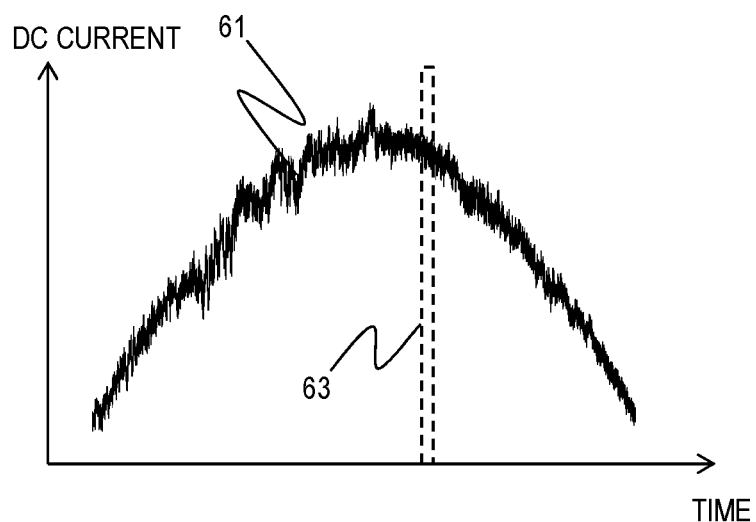
FIG. 6A is a graph for showing a DC current observed in the photovoltaic power generation system according to the first embodiment of this invention.
Figure 6B:
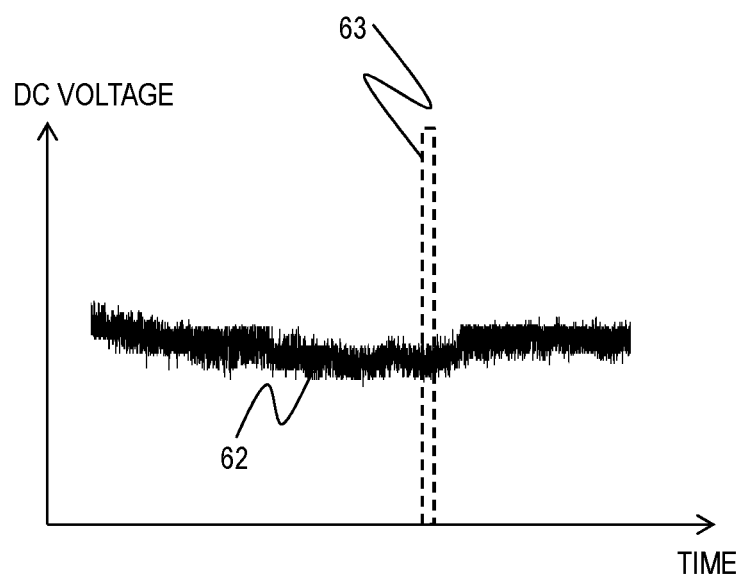
FIG. 6B is a graph for showing a DC voltage observed in the photovoltaic power generation system according to the first embodiment of this invention.

FIG. 6A is a graph for showing the DC current and FIG. 6B is a graph for showing the DC voltage, which are observed in the photovoltaic power generation system according to the first embodiment of this invention.

An observation value 61 of the DC current on a clear and sunny day is shown in FIG. 6A, whereas an observation value 62 of the DC voltage on a clear and sunny day is shown in FIG. 6B. Values of the DC currents observed respectively by the plurality of current measurement apparatus 3a generally differ from each other. However, when the values of the DC currents are observed in the same time slot on the same day, profiles of the values of the DC currents are similar to each other. Similarly, the value of the DC current observed by each of the current measurement apparatus 3a is different from a value of the DC current observed by the current measurement apparatus 4a. However, profiles of the values of the DC currents are similar to each other. The observation value 61 shown in FIG. 6A is a representative example of the DC current observed by each of the current measurement apparatus 3a and 4a. Similarly, the observation value 62 shown in FIG. 6B is a representative example of the DC voltage observed by the voltage measurement apparatus 3b and 4b.

In addition to variations in solar radiation amount and temperature, a fluctuation due to ripples, which is affected by a switching operation performed by the MPPT control unit 4g of the power conditioner 4, affects the observation values 61 and 62. An example where the observation value in a time slot 63 shown in FIG. 6A and FIG. 6B is extracted in an enlarged manner is described referring to FIG. 7A to FIG. 7C.

Figure 7A:
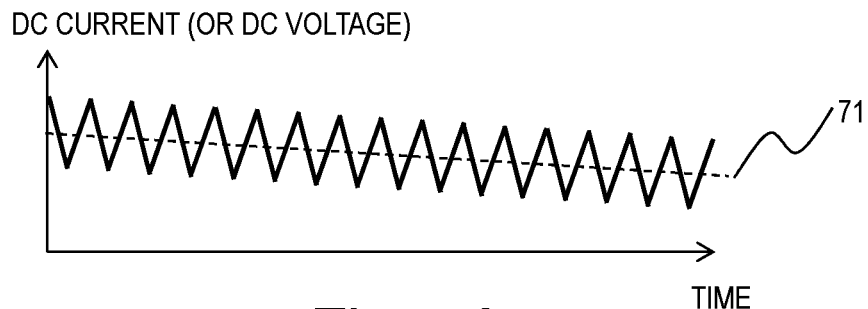
FIG. 7A to FIG. 7C are graphs of a waveform of the DC current and the DC voltage observed in the photovoltaic power generation system according to the first embodiment of this invention and sampling thereof.
Figure 7B:
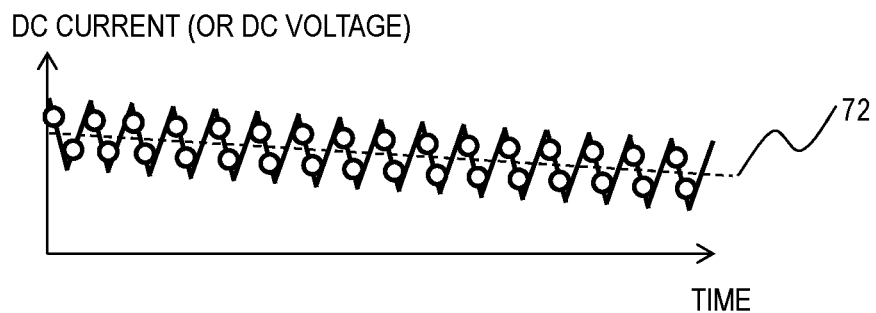
Figure 7C:
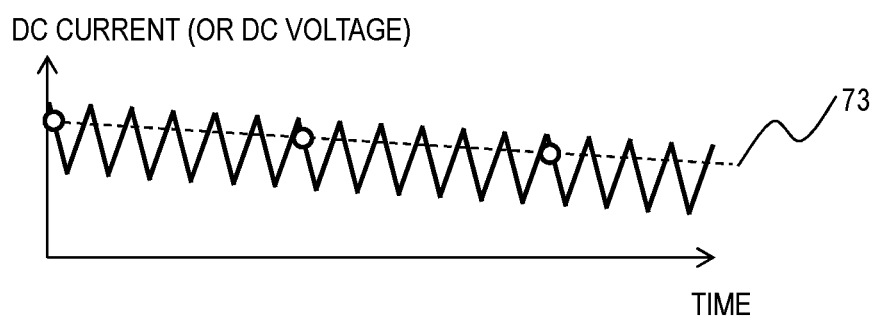

FIG. 7A to FIG. 7C are graphs of a waveform of the DC current and the DC voltage observed in the photovoltaic power generation system according to the first embodiment of this invention and sampling thereof.

When the DC current and the DC voltage observed within the relatively short time slot 63 as shown in FIG. 6A and FIG. 6B are enlarged in a time axis direction, a similar waveform is observed for each. FIG. 7A is a graph for schematically showing a waveform common to the DC current and the DC voltage observed as described above. Fluctuations of the waveforms shown in FIG. 7A are ripples. The ripple appears as an amplitude at several kilohertz, which is a switching speed of the power conditioner 4. An actual DC value is a value as indicated by a broken line 71.

The current and the voltage in the power conditioner 4 are generally measured after being sampled at intervals twice as large as the switching speed as shown in FIG. 7B so as to perform the MPPT control precisely to enhance efficiency of power to be extracted. When an average or a moving average of the sampled data is plotted, a value as indicated by a broken line 72 is obtained. Therefore, a value equal to the actual DC value indicated by the broken line 71 can be measured.

Meanwhile, in the case of the current measurement apparatus 3a installed in the power collection rack 3, a cutoff frequency of the low-pass filter is required to be set low so as to remove noise in the periphery. Therefore, the current and the voltage are generally sampled at a speed slower by one or more order of magnitude than the switching speed at several kilohertz, as shown in FIG. 7C. Thus, when an average or a moving average of the sampled data is plotted at sampling intervals shown in FIG. 7C, a value indicated by a broken line 73 is obtained. This value greatly deviates from the actual DC value 71, leading to decrease in accuracy. Further, in the current measurement apparatus 3a and the voltage measurement apparatus 3b included in the power collection rack 3, sampling timing cannot be synchronized with the switching operation of the power conditioner 4. Therefore, an error depends on an amplitude level of the ripples.

Figure 8A:
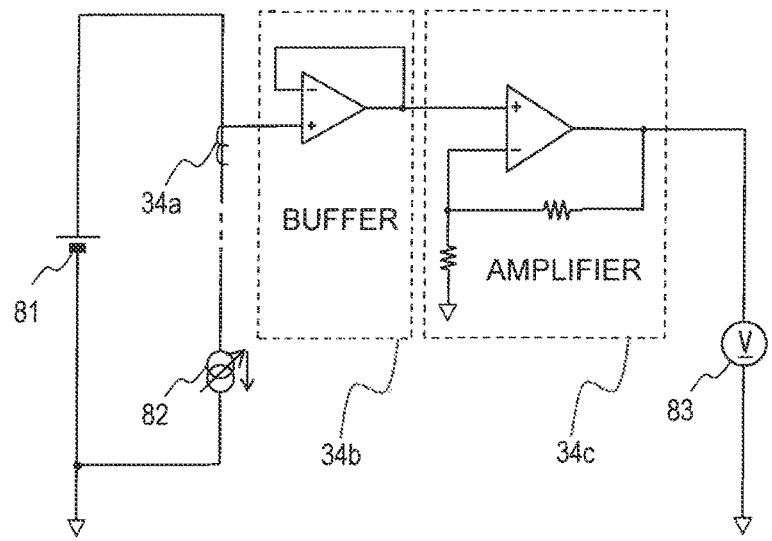
FIG. 8A is an explanatory diagram for illustrating a configuration of the current measurement apparatus according to the first embodiment of this invention.
Figure 8B:
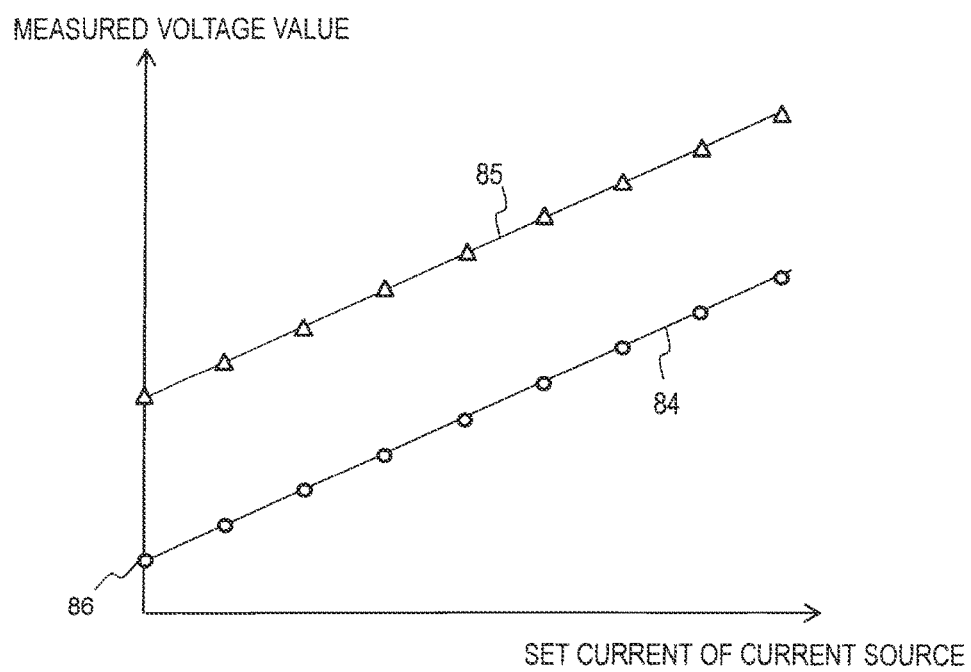
FIG. 8B is a graph for showing a temperature characteristic of the current measurement apparatus according to the first embodiment of this invention.

FIG. 8A is an explanatory diagram for illustrating a configuration of the current measurement apparatus 3a according to the first embodiment of this invention, and FIG. 8B is a graph for showing a temperature characteristic of the current measurement apparatus 3a according to the first embodiment of this invention.

In FIG. 8B, a stable current generated by a voltage source 81 and a variable current source 82 as illustrated in FIG. 8A is shown as a set current of a current source and an analog voltage prior to AD conversion in the current measurement apparatus 3a is shown as a measured voltage value. A straight line 84 indicates a result of measurement at 25 degrees Celsius, whereas a straight line 85 indicates a result of measurement when an ambient temperature becomes lower than 25 degrees Celsius. As shown in FIG. 8B, when a measurement unit having a high insulation property like the CT sensor 34a is used, a change in an offset 86 due to the temperature is large and an amplitude range that can be subjected to the AD conversion is limited. Therefore, a temperature range in which the measurement can be carried out with high accuracy is limited.

From the fact described above, when the failure diagnosis is carried out using the current measurement apparatus 3a installed in the power collection rack 3, a countermeasure technology against the decrease in accuracy due to the temperature and the sampling is introduced, thereby realizing a determination with high accuracy.

Figure 9:
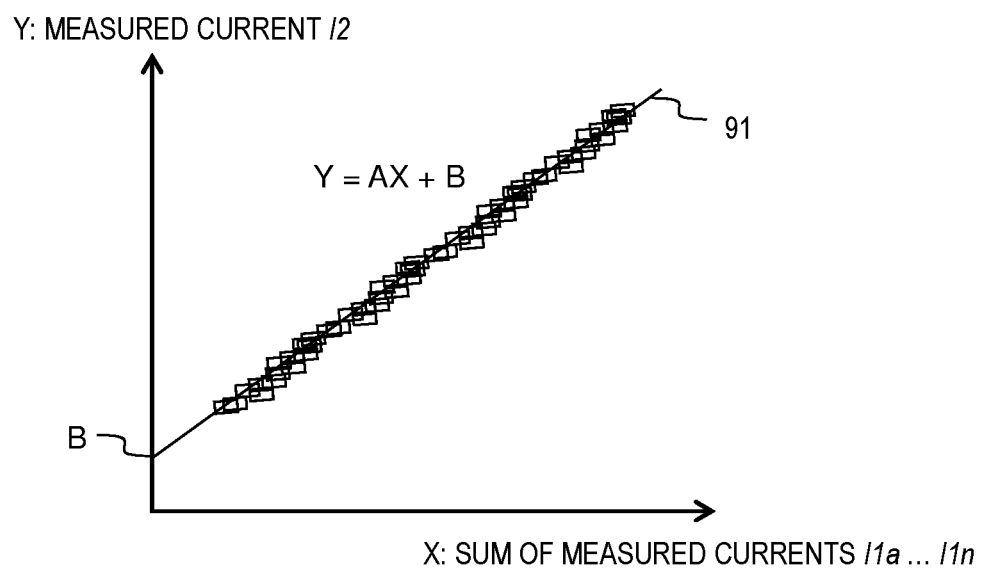
FIG. 9 is a graph of a correlation between a current value measured in a power collection rack and a current value measured in a power conditioner according to the first embodiment of this invention.

FIG. 9 is a graph of a correlation between the current value measured in the power collection rack 3 and the current value measured in the power conditioner 4 according to the first embodiment of this invention.

Specifically, FIG. 9 is a graph for showing a correlation between a sum I1 (sum of I1A to I1n illustrated in FIG. 1) of a plurality of measured current values obtained from the plurality of current measurement apparatus 3a installed in the power collection rack 3 and a measured current I2 (I2 illustrated in FIG. 1) in the power conditioner 4. A straight line 91 is a regression line obtained by a correlation plot, and is expressed as: $I2 = A \times I1 + B$. In this expression, A is a ratio of linearity of the current measurement apparatus 3a and linearity of the current measurement apparatus 4a, and is a value specific to the measurement apparatus. Meanwhile, B is an offset value of the measured current. A temperature inside the power collection rack 3 is not controlled (specifically, may vary depending on the weather, a power generation amount, and the like), whereas a temperature inside the power conditioner 4 is kept constant (to 25 degrees Celsius in this embodiment) by the cooler 4c. Therefore, B varies depending on an ambient temperature of the current measurement apparatus 3a provided inside the power collection rack 3.

Figure 10:
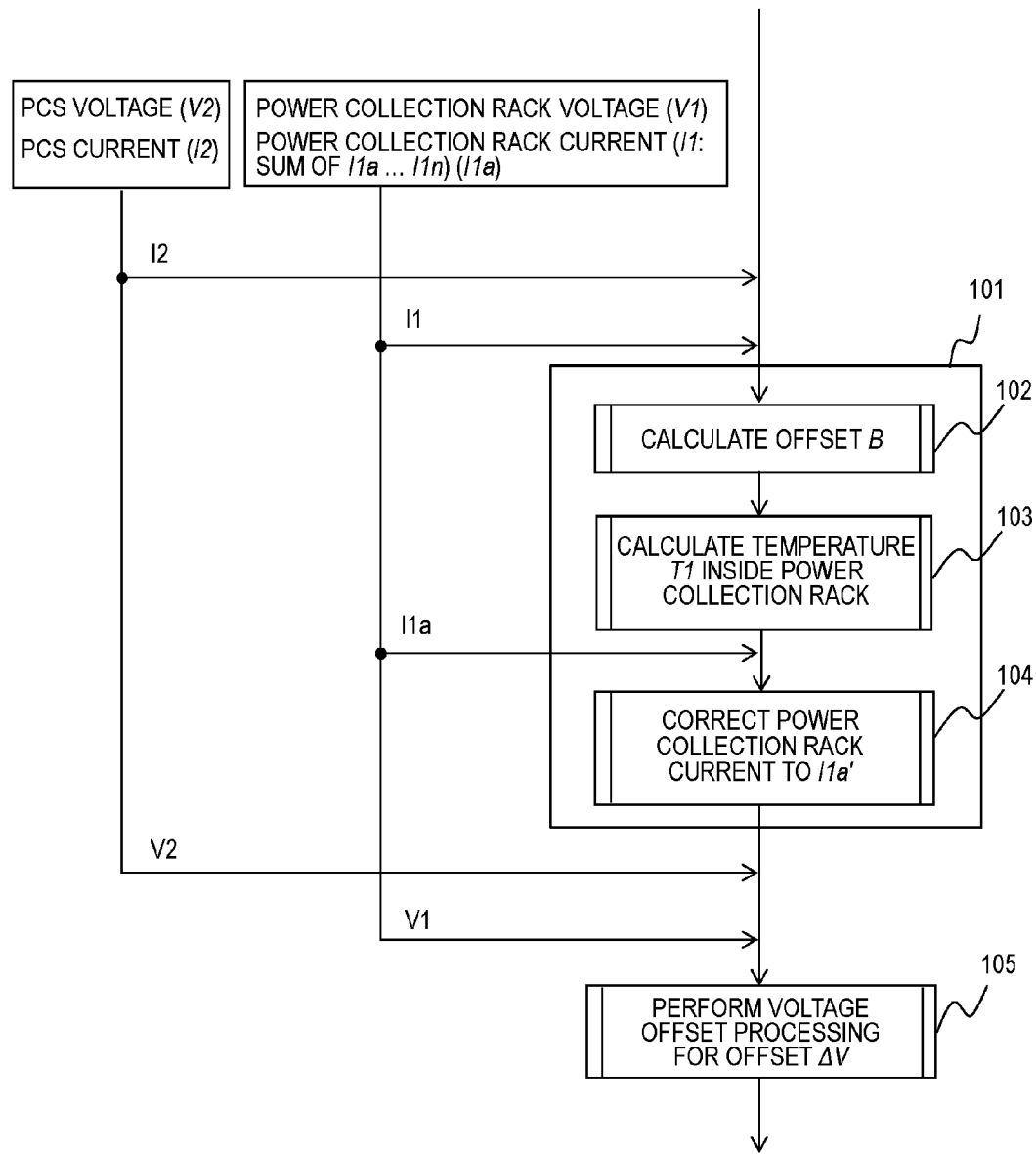
FIG. 10 is a flowchart for illustrating processing that is executed by a monitoring apparatus according to the first embodiment of this invention so as to cope with the decrease in accuracy of the measurement value due to the temperature.

FIG. 10 is a flowchart for illustrating processing that is executed by the monitoring apparatus 6 according to the first embodiment of this invention so as to cope with the decrease in accuracy of the measurement value due to the temperature.

The computing unit 6b of the monitoring apparatus 6 uses the relationship shown in FIG. 9 to correct a measured current I1a and a measured voltage V1 in the power collection rack 3. As described above, A is the specific value. Therefore, in Step 102, the computing unit 6b calculates the offset B by Expression (1).

$$B = I2/A - I1 \quad (1)$$

As described above, it is considered that a value of B changes depending on the ambient temperature of the current measurement apparatus 3a. Therefore, when temperature dependency of the current measurement apparatus 3a is β [ampere/degree Celsius], an ambient temperature T1 of the current measurement apparatus 3a is expressed by Expression (2). In Step 103, the computing unit 6b calculates the ambient temperature T1 of the current measurement apparatus 3a by Expression (2).

$$T1 = 298 + B/\beta \quad (2)$$

Further, in Step 104, the computing unit 6b corrects the measured current I1a to be diagnosed to I1a' by Expression (3) for use in a calculation described later.

$$I1a' = (I1a - B)/A \quad (3)$$

In Expression (3), I1a' is obtained by shift correction on I1a with the temperature and correction on the linearity of the current measurement apparatus 4a of the power conditioner 4. In other words, I1a' calculated by Expression (3) is an estimate value which is assumed to be obtained in a measurement of the current by the current measurement apparatus 4a of the power conditioner 4 kept at 25 degrees Celsius or a current measurement apparatus having linearity equal to that of the current measurement apparatus 4a when the current measurement apparatus 3a of the power collection rack 3 measures I1a as a value (however, the estimate value still contains the offset due to insufficient sampling described later). The correction from I1a to I1a' is expressed by Expression (3). In the same way, I1a to I1n are respectively corrected to I1a' to I1n'. Processing performed in Step 101 containing Step 102 to Step 104 described above is defined as "current offset processing".

Similarly, in Step 105, the computing unit 6b calculates an offset ΔV between the voltage measured by the voltage measurement apparatus 3b and the voltage measured by the voltage measurement apparatus 4b by Expression (4). Processing performed in Step 105 is defined as "voltage offset processing".

$$\Delta V = \text{(sampling average value of } V1\text{)} - \text{(sampling average value of } V2\text{)} \quad (4)$$

The offset ΔV can be calculated by Expression (4) for the following reason. The voltage measurement apparatus 3b and the voltage measurement apparatus 4b measure the same voltage, and therefore the measurement values thereof are expected to be the same. When the measurement values are not the same, it is considered that a difference therebetween is the offset due to the sampling shown in FIG. 7C.

Figure 12:
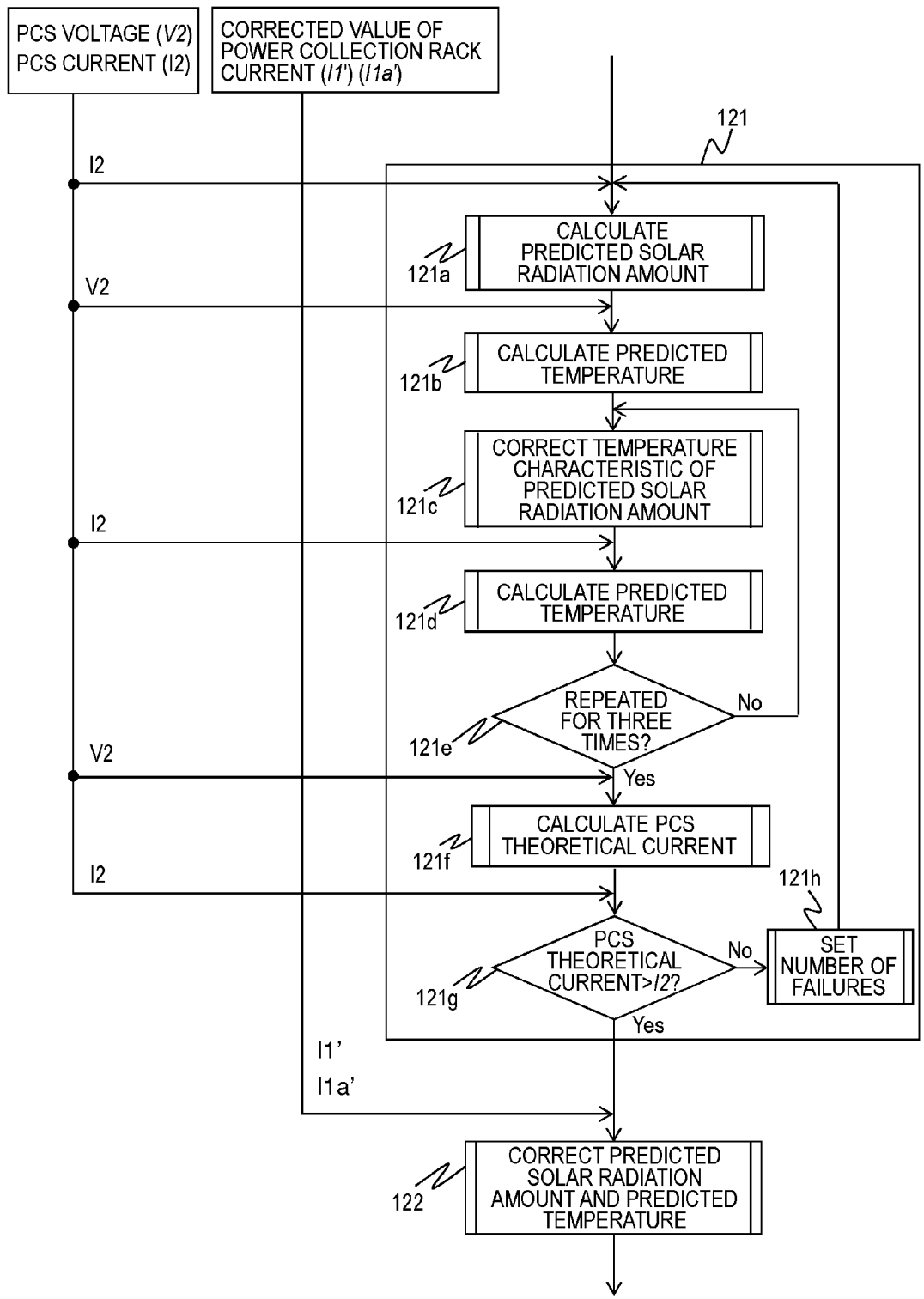
FIG. 12 is a flowchart for illustrating processing that is executed by the monitoring apparatus according to the first embodiment of this invention to cope with the decrease in accuracy of the measurement values due to the sampling.

FIG. 12 is a flowchart for illustrating processing that is executed by the monitoring apparatus 6 according to the first embodiment of this invention to cope with the decrease in accuracy of the measurement values due to the sampling.

For description of a flow of FIG. 12, characteristics of the photovoltaic battery are described. The photovoltaic cell string 1 having Ncell as the number of cells can be expressed by Expression (5) by using parameters, which are I: an output current [ampere], Is: an opposite-direction saturation current [ampere], V: an output voltage [voltage], Isc: a short-circuit current [ampere], T: a photovoltaic cell element absolute temperature [kelvin], k: a Boltzmann constant (Joule/kelvin), Rs: an interconnection resistance [ohm], q: a charge quantity of an electron [coulomb], Rsh: a shunt resistance [ohm], nf: a junction constant, and p: a solar radiation amount [kilowatt/square meter].

$$I = Isc \cdot p - Is \cdot \{\exp(q \cdot (V/(Ncell) + Rs \cdot I)/(nf \cdot k \cdot T))\} - (V/(Ncell) + Rs \cdot I)/Rsh \quad (5)$$

When M photovoltaic cell strings 1 are bundled in each of the junction boxes 2, the measurement current I1a in the power collection rack 3 corresponds to M×I [ampere]. Further, when N junction boxes are coupled to the power collection rack 3, the sum I1 of currents measured by all the current measurement apparatus 3a of the power collection rack 3 and the current I2 measured by the current measurement apparatus 4a of the power conditioner 4 correspond to: N×M×I [ampere].

Figure 11:
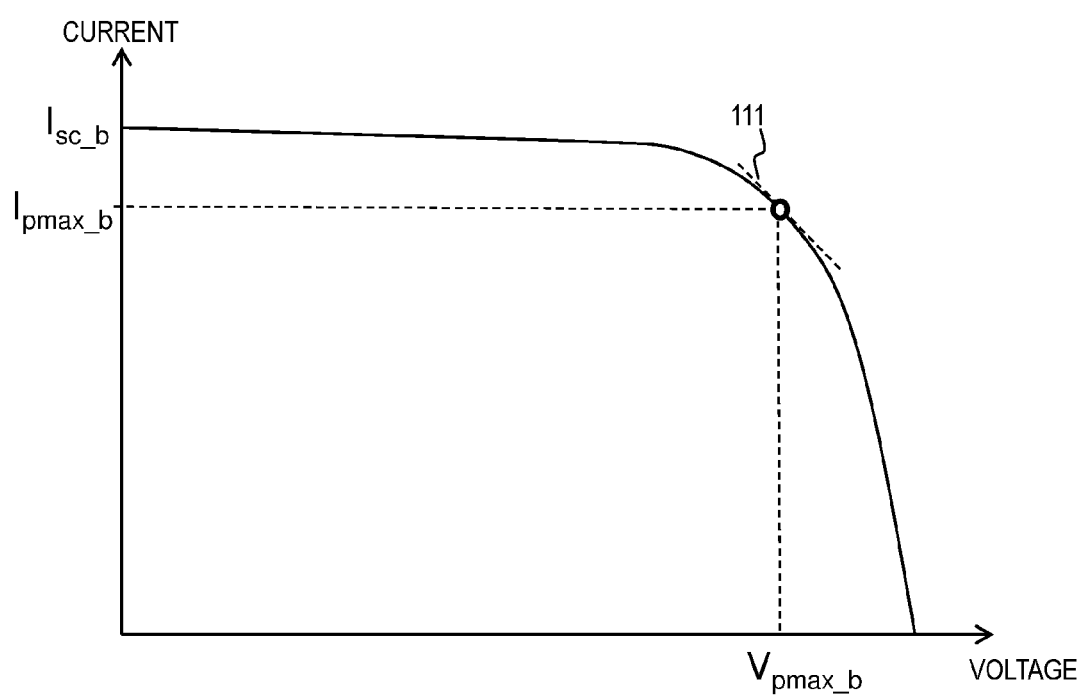
FIG. 11 is a graph for showing a current-voltage characteristic of the photovoltaic power generation system according to the first embodiment of this invention.

FIG. 11 is a graph for showing a current-voltage characteristic of the photovoltaic power generation system according to the first embodiment of this invention.

Specifically, a relationship between N×M×I [ampere] and V [volt] described above is shown in FIG. 11. Through the MPPT control of the power conditioner 4, the photovoltaic power generation system operates at a point at which power becomes maximum (voltage Vpmax_b, current Ipmax_b).

The inventors of this invention have found that a correlation between an operating current and a short-circuit current is extremely high regardless of a variation in manufacture of the photovoltaic cell modules and a kind of the photovoltaic cell modules through evaluation of several tens of thousands of 100 to 200 watt class photovoltaic cell modules that form a large-scale photovoltaic power generation system. Further, the inventors of this invention have found that a ratio J of the operating current and the short-circuit current determined for each photovoltaic cell module is kept approximately constant within a solar radiation amount range of from 0.1 kilowatt/square meter to 1.0 kilowatt/square meter in which the MPPT control is performed and a temperature range for actual use. In this specification, the ratio J of the operating current and the short-circuit current is sometimes referred to as "predetermined coefficient".

The operating current measured in the current measurement apparatus 4a of the power conditioner 4 is defined as Ipmax_b, the solar radiation amount in a standard state is defined as 1.0 kilowatt/square meter, and the short-circuit current and a maximum operating current at an operating temperature of 25 degrees Celsius are respectively defined as Isc_0 and Ipmax_0. When the operating temperature at the time of measurement of the operating current Ipmax_b is Tb and an ordinary temperature (25 degrees Celsius in this embodiment) is Ta, a solar radiation amount pb at the time of measurement of the operating current Ipmax_b can be calculated by Expression (6) to Expression (8) using a temperature coefficient α of the short-circuit current.

$$J = Ipmax\_0/Isc\_0 \quad (6)$$

$$Isc\_0[Tb] = Isc\_0 + \alpha \cdot (Tb - Ta) \quad (7)$$

$$pb = (Ipmax\_b/J)/Isc\_0[Tb] \quad (8)$$

Here, the plurality of photovoltaic cell strings grouped together in the power conditioner 4 are considered as one unit. Then, in view of early detection of a failure, the ratio J of the operating current and the short-circuit current can be reliably regarded as being kept constant.

From the relationship described above, in the failure diagnosis method of this embodiment, the value predicted as the solar radiation amount on the photovoltaic cell array, specifically, the predicted solar radiation amount pb is calculated by using the ratio J of the operating current and the short-circuit current per photovoltaic cell array, which are measured in the power conditioner 4 operating at a sufficiently high sampling speed. Next, a value predicted as the operating temperature of the photovoltaic cell array, specifically, the predicted temperature Tb is calculated by using the operating voltage per photovoltaic cell array, which is measured in the power conditioner 4.

Although it is common to use a thermocouple or the like for temperature measurement of the photovoltaic cell array, the thermocouple has generally low measurement accuracy. Therefore, in the failure diagnosis method of this embodiment, the operating temperature is calculated only from the operating current Ipmax_b and the operating voltage Vpmaxb, which are measured in the power conditioner 4. An open voltage Voc_b can be expressed by using a temperature coefficient β1 [volt/degree Celsius] of the open voltage of the photovoltaic cell array as Expression (9) when an open voltage at the ordinary temperature Ta is Voc_a.

$$Voc\_b = Voc\_a + \beta 1 \cdot (Tb - Ta) \quad (9)$$

Next, when the above-mentioned coefficient J is used, the operating current Ipmax_b can be expressed as Expression (10) under the same condition of the operating temperature Tb.

$$Ipmax\_b = J \cdot Isc\_0[Tb] \cdot pb \quad (10)$$

In this expression, Isc_0[Tb] is a short-circuit current at the temperature Tb with the solar radiation amount of 1.0 kilowatt/square meter, and is obtained by Expression (7).

The operating voltage Vpmax_b and the open voltage Voc_b are respectively expressed as Expression (11) and Expression (12).

$$Vpmax\_b = Ncell \cdot (nf \cdot k \cdot Tb)/q \cdot \ln\{(Isc\_0[Tb] \cdot pb - Ipmax\_b)/Is\} \quad (11)$$

$$Voc\_b = Ncell(nf \cdot k \cdot Tb)/q \cdot \ln\{(Isc\_0[Tb] \cdot pb)/Is\} \quad (12)$$

By combining Expression (11) and Expression (12), Expression (13) is obtained.

$$Vpmax\_b - Voc\_b = Ncell((nf \cdot k \cdot Tb)/q) \cdot \ln(1-J) \quad (13)$$

By assigning Expression (9) into Expression (13), Expression (14) is obtained.

$$Tb = (Vpmax\_b - Voc\_a - \beta 1 \cdot Ta)/(Ncell \cdot (nf \cdot k/q) \cdot \ln(1-J) + \beta 1) \quad (14)$$

Specifically, by solving the linear equation, the photovoltaic cell array operating temperature Tb (=predicted temperature) can be calculated from the operating voltage Vpmax_b measured in the power conditioner 4 and the open voltage at the ordinary temperature.

Next, a method of correcting the obtained predicted solar radiation amount and predicted temperature for diagnosis of the power collection rack 3 with insufficient sampling is described. The offset of the sum I1 of the measured currents and the linearity of the power collection rack 3 are also corrected to obtain I1'(=(I1−B)/A). For Ipmax_b [ampere] shown in FIG. 11, the measurement current I2 in the power conditioner 4 is close to a true value as shown in FIG. 7A to FIG. 7C. On the other hand, even after the offset and the linearity are corrected as described above, I1' still contains a measurement error due to the insufficient sampling. Although there is a differential between measured absolute values of I1' and I2, I1' and I2 are the same in that the current at an operating point at which the power becomes maximum shown in FIG. 11 is measured. Therefore, the ratio of the operating current and the short-circuit current is equal for both of I1' and I2. Further, a value indicated by ∂V/∂I in terms of a characteristic of I1' and I2 (gradient 111 of the operating voltage with respect to the operating current at the operating point at which the power is maximum in FIG. 11) is equal for both. When a corrected predicted solar radiation amount is pb' and a corrected predicted temperature is Tb', Expression (15) is satisfied based on the relationship in which the ratio of the operating current and the short-circuit current is equal.

$$I2/\{(Isc\_0+\alpha \cdot (Tb-Ta)) \cdot pb\} = I1'/\{(Isc\_0+\alpha \cdot (Tb'-298)) \cdot pb'\} \quad (15)$$

For ∂V/∂I, when Expression (5) is deformed, in consideration of Ncell, nf, q, and k being fixed values, Expression (16) is satisfied based on a relationship in which ∂V/∂I/(Ncell·(nf·k/q)) is equal.

$$Tb/\{(Isc\_0+\alpha \cdot (Tb-Ta)) \cdot pb - I2\} = Tb'/\{(Isc\_0+\alpha \cdot (Tb'-Ta)) \cdot pb' - I1'\} \quad (16)$$

By solving Expression (15) and Expression (16), the predicted temperature and the predicted solar radiation amount are corrected as expressed by Expression (17) and Expression (18).

$$Tb' = (I1'/I2)/\{(Isc\_0+\alpha \cdot (Tb-Ta)) \cdot pb - I1'\} \cdot Tb/\{(Isc\_0+\alpha \cdot (Tb-298)) \cdot pb - I1\} \quad (17)$$

$$pb' = (I1'/I2)/\{Isc\_0+\alpha \cdot (Tb'-298)\} \cdot \{(Isc\_0+\alpha \cdot (Tb-298)) \cdot pb\} \quad (18)$$

As expressed by Expression (6) to Expression (14), Tb and pb are respectively the predicted temperature and the predicted solar radiation amount calculated based on the measurement values of the current measurement apparatus 4a and the voltage measurement apparatus 4b of the power conditioner 4. On the other hand, Tb' and pb' calculated by Expression (15) to Expression (18) are respectively values obtained by correcting Tb and pb so as to match the measurement values with the corrected linearity and the corrected offset of the current measurement apparatus 3a and the voltage measurement apparatus 3b of the power collection rack 3, that is, values of the predicted temperature and the predicted solar radiation amount that are assumed to be calculated when the error due to the insufficient sampling as shown in, for example, FIG. 7C, which is similar to that of the current measurement apparatus 3a and the voltage measurement apparatus 3b of the power collection rack 3, is added to the measurement values of the current measurement apparatus 4a and the voltage measurement apparatus 4b of the power conditioner 4. A theoretical current calculated based on the thus corrected Tb' and pb' can be compared to I1a' or the like still containing the error due to the insufficient sampling even after the correction of the linearity and the offset.

Processing illustrated in FIG. 12 is described referring to the expressions described above. First, in Step 121a, the computing unit 6b calculates the predicted solar radiation amount pb by Expression (6) to Expression (8). At this time, a value of Tb is unknown. Therefore, the computing unit 6b calculates the predicted solar radiation amount pb using Ta as an initial value of Tb.

Next, in Step 121b, the computing unit 6b calculates the predicted temperature by using Expression (9) to Expression (14). Next, in Step 121c, the computing unit 6b uses the calculated predicted temperature to correct the estimated solar radiation amount by Expression (7) and Expression (8) so as to calculate the predicted temperature again in Step 121d. Processing of Step 121d is performed using Expression (9) to Expression (14) as in Step 121b. The computing unit 6b repeats processing of Step 121c and 121d for a predetermined number of times (for example, three times) to converge the calculation.

When determining in Step 121e that the processing of Step 121c and Step 121d has been repeated for three times, the computing unit 6b executes Step 121f. In Step 121f, the computing unit 6b calculates a theoretical current at the measured voltage V2 by Expression (5) under the predicted temperature and the predicted solar radiation amount calculated up to Step 121d as conditions. Next, in Step 121g, the computing unit 6b compares the theoretical current with the measured current I2. Here, when it is determined that the theoretical current is larger than the measured current, the computing unit 6b changes, in Step 121h, the value of Ncell in Expression (5), and then executes Step 121a to Step 121g again. When it is determined in Step 121g that the theoretical current and the measured current are equal to each other, the processing proceeds to Step 122. Processing of Step 121 including Step 121a to Step 121h described above is defined as processing of calculating the predicted solar radiation amount and the predicted temperature.

For example, the computing unit 6b may execute Step 121 after setting the number of all the photovoltaic cells 12a included in the photovoltaic cell array of the photovoltaic power generation system illustrated in FIG. 1 as an initial value of Ncell. When all the photovoltaic cells 12a operate normally, the theoretical current and the measured current are equal to each other. On the other hand, when at least one photovoltaic cell 12a is failed, the measured current becomes smaller than the theoretical value. Therefore, the computing unit 6b executes Step 121a to Step 121g after reducing the value of Ncell in Step 121h. As a result, when the theoretical current and the measured current become equal to each other, the value of Ncell at this time is the number of photovoltaic cells 12a that are normally operating in the photovoltaic cell array. Specifically, a difference between the number of all the photovoltaic cells 12 included in the photovoltaic cell array and the value of Ncell obtained when the theoretical current and the measured current become equal to each other is the number of failed photovoltaic cells 12 (specifically, the number of failures).

In practice, even when the value of Ncell becomes equal to the number of normally operating photovoltaic cells 12a, the theoretical current and the measured current do not become perfectly equal to each other. Therefore, when a relationship between the theoretical current and the measured current satisfies a predetermined condition, the computing unit 6b may determine that the theoretical current and the measured current are equal to each other. For example, the computing unit 6b may determine that the relationship between the theoretical current and the measured current satisfies the predetermined condition in the following case.

Specifically, in a case where a difference between the theoretical current and the measured current is smaller than a predetermined value, when the measured current becomes equal to or larger than the theoretical current for the first time after the computing unit 6b executes Step 121a to Step 121g while sequentially reducing the value of Ncell or when the difference between the theoretical current and the measured current is the smallest during execution of Step 121a to Step 121g for a plurality of times with a sequential change of the value of Ncell, the computing unit 6 may determine that the relationship between the theoretical current and the measured current satisfies the predetermined condition.

Next, in Step 122, the computing unit 6b uses Expression (17) and Expression (18) to correct the predicted temperature and the predicted solar radiation amount for diagnosis of the measurement value of the power collection rack 3.

Figure 13:
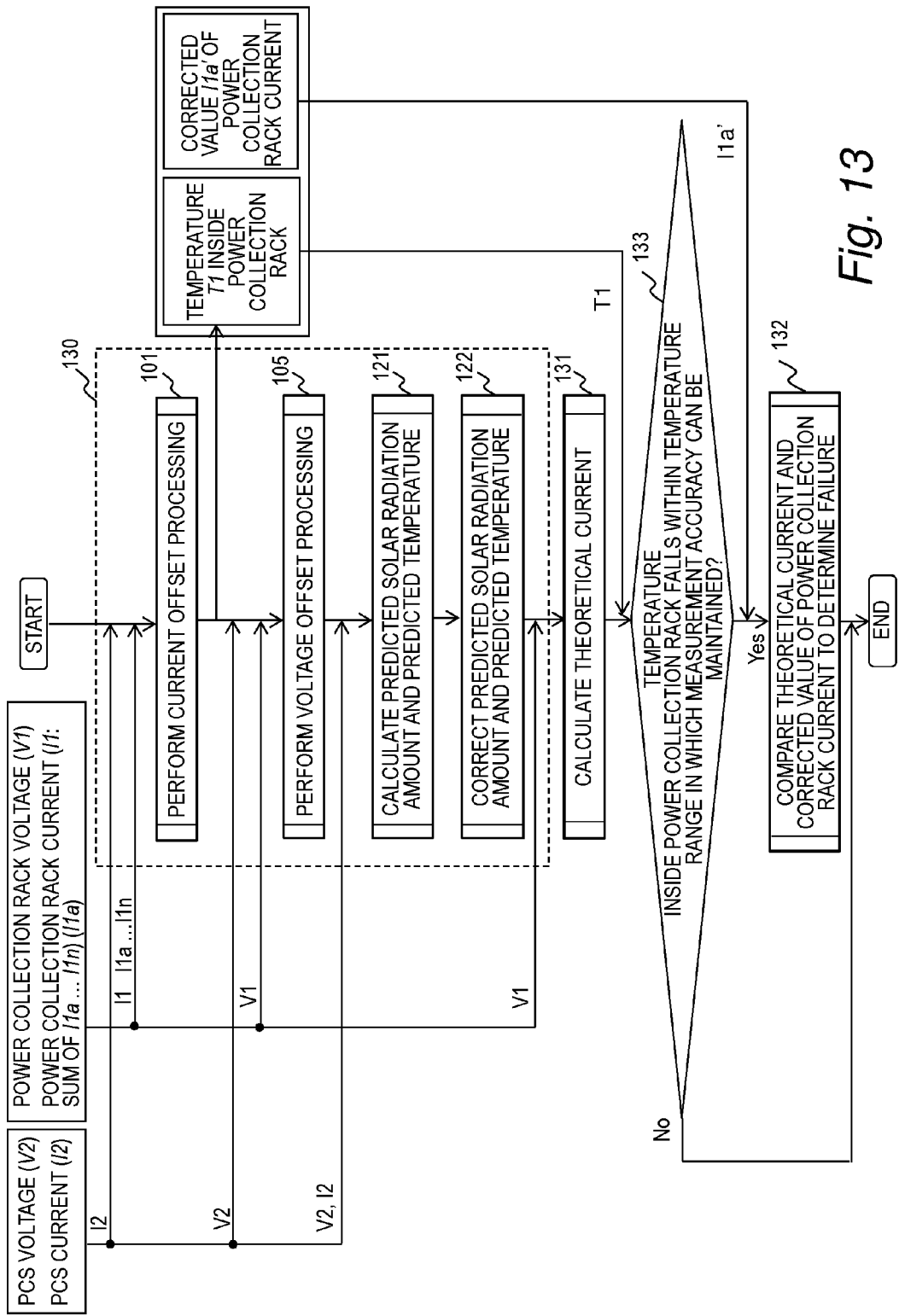
FIG. 13 is a flowchart for illustrating overall failure diagnosis processing executed by the monitoring apparatus according to the first embodiment of this invention.

FIG. 13 is a flowchart for illustrating overall failure diagnosis processing executed by the monitoring apparatus 6 according to the first embodiment of this invention.

First, the computing unit 6b executes the processing of Step 101, Step 105, Step 121, and Step 122 described referring to FIG. 10 and FIG. 12 in the stated order so as to calculate a theoretical current at the measured voltage V1 in Step 131 under the conditions of the corrected predicted radiation amount pb' and the corrected predicted temperature Tb'. At this time, the computing unit 6b calculates the theoretical current from Expression (5) by using a value obtained by adding an offset voltage $\Delta V$ calculated by Expression (4) to the measured voltage V1.

Here, the computing unit 6b can calculate the theoretical current corresponding to a total value of the currents between the power collection rack 3 and all the junction boxes 2 (specifically, a theoretical current corresponding to a total value of I1a to I1n) by using the number of all the photovoltaic cells 12a included in the entire photovoltaic cell array as the values of Ncell. Further, the computing unit 6b can calculate the theoretical currents respectively corresponding to the currents I1a to I1n from the respective junction boxes 2 by using the numbers of photovoltaic cells 12a coupled to the respective junction boxes 2 as the values of Ncell.

Next, the computing unit 6b checks whether or not the ambient temperature T1 of the current measurement apparatus 3a in the power collection rack 3, which is calculated by Expression (2) in Step 101, falls within a temperature range in which desired measurement accuracy of the current measurement apparatus 3a can be maintained (Step 133). When the ambient temperature does not fall within the temperature range, the diagnosis is interrupted without performing the processing. In this manner, a result of diagnosis with low reliability based on a measurement value with low accuracy is prevented from being output.

When it is determined in Step 133 that the ambient temperature T1 falls within the temperature range, the value of the current measured by the current measurement apparatus 3a is expected to have predetermined measurement accuracy. Therefore, the computing unit 6b compares the theoretical current with I1a' calculated by Expression (3) so as to determine a failure based on the result of comparison (Step 132). More specifically, the computing unit 6b compares the corrected measured current I1a' to I1n' with the calculated theoretical currents respectively corresponding to the junction boxes 2. As a result, when, for example, any of I1a' to I1n' is smaller than the theoretical current corresponding thereto and a difference therebetween is a predetermined value (threshold value) or larger, the computing unit 6b may determine that any of the photovoltaic cells 12a coupled to the junction box 2 in which the current is measured is failed and the photovoltaic cells 12a coupled to the other junction boxes 2 are normal.

As described above, according to the first embodiment, the number of failures in the entire photovoltaic cell array is estimated based on the current and voltage measured in the power conditioner 4. Further, when the photovoltaic cell array is divided into a plurality of partial photovoltaic cell arrays, each including a plurality of photovoltaic cells (each section corresponds to the photovoltaic cell string group coupled to each of the junction boxes 2 in the first embodiment), a failure can be determined for each of the sections based on the current and voltage measured for each of the sections (the currents of the respective junction boxes measured in the power collection rack and the voltage obtained when the junction boxes are coupled in parallel in the first embodiment). At this time, the current measured for each of the sections and the theoretical current for each of the sections are compared with each other.

The theoretical current is calculated based on the predicted solar radiation amount and the predicted temperature calculated from the current and the voltage measured in the power conditioner 4. The current and the voltage measured for each of the sections contain an error due to the linearity of the measurement apparatus, the error due to the temperature fluctuation, and the error due to the insufficient sampling with respect to the current and the voltage measured in the power conditioner 4. The error due to the linearity and the error due to the temperature fluctuation are corrected based on a sum value of the currents for the respective sections, a total current, and a specific value of the linearity of each of the measurement apparatus.

Further, the error due to the insufficient sampling is canceled in the following manner. Specifically, the ratio of the current and the short-circuit current at the operating point at which the power becomes maximum, and the solar radiation amount and the operating temperature used to calculate the gradient (specifically, $\partial V/\partial I$) of the voltage with respect to the current at the operating point at which the power becomes maximum are specified based on the current and the voltage measured in the power collection rack so that the ratio of the current and the short-circuit current at the operating point at which the power becomes maximum and the gradient of the voltage with respect to the current at the operating point at which the power becomes maximum, which are calculated based on the current and the voltage measured in the power collection rack, become the same as the ratio of the current and the short-circuit current at the operating point at which the power becomes maximum and the gradient of the voltage with respect to the current at the operating point at which the power becomes maximum, which are calculated based on the current and the voltage measured in the power conditioner 4. The theoretical current is calculated by using the specified solar radiation amount and operating temperature, thereby canceling the error due to the insufficient sampling.

In this manner, the correction value of the current measured for each of the sections and the theoretical current calculated for each of the sections can be compared with each other. Therefore, even in, in particular, the photovoltaic power generation system including the large-scale photovoltaic cell array, a portion having a high possibility of including the failed photovoltaic cell can be specified.

Second Embodiment

Next, a second embodiment of this invention is described. Except for differences described below, the components of the system according to the second embodiment have the same functions as the components of the first embodiment that are illustrated in FIG. 1 to FIG. 13 and denoted by the same reference symbols. Descriptions thereof are therefore omitted here.

An individual variability of the offset 86 shown in FIG. 8B is sometimes large depending on the used current measurement apparatus 3a. Therefore, in some cases, it is difficult to set the threshold value for the failure determination (Step 132 of FIG. 13) based on the differences between I1a' to I1n' described in the first embodiment and the theoretical currents respectively corresponding thereto. The failure diagnosis in such a case is described below.

Figure 14A:
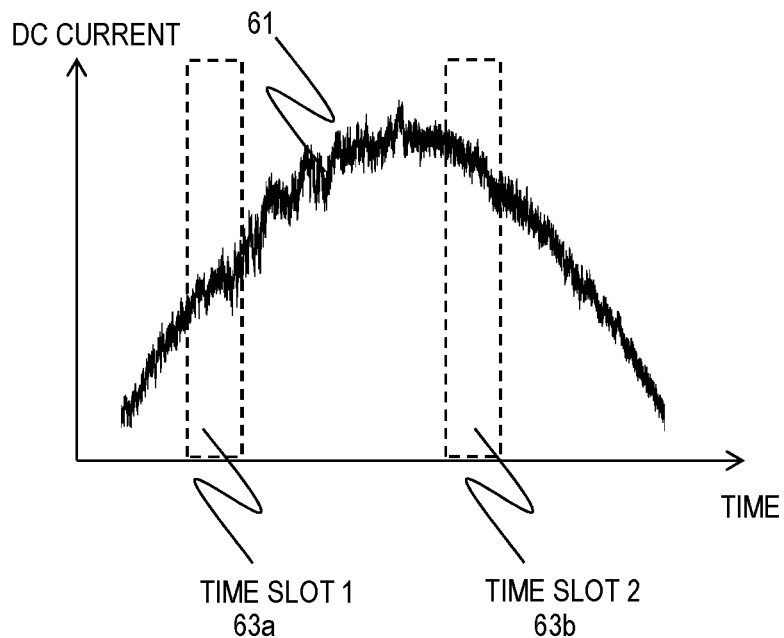
FIG. 14A and FIG. 14B are graphs for showing an example of a DC current and a DC voltage on one day in a photovoltaic power generation system according to a second embodiment of this invention.
Figure 14B:
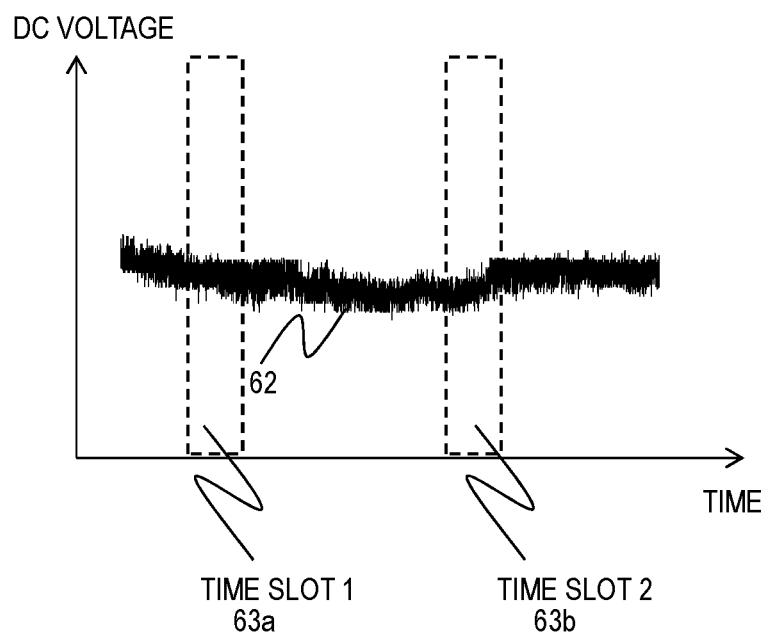

FIG. 14A and FIG. 14B are graphs for showing an example of a DC current and a DC voltage on one day in the photovoltaic power generation system according to the second embodiment of this invention.

For example, the observation value 61 of the DC current and the observation value 62 of the DC voltage, which are output from the photovoltaic cell array on a sunny and clear day, change with time (specifically, depending on the solar radiation amount at each time) as shown in FIG. 14A and FIG. 14B. One-day data as described above is stored in the memory 6a of the monitoring apparatus 6. The computing unit 6b selects two time slots respectively having different observation values 61 of the DC current, for example, a time slot 1 63a and a time slot 2 63b.

Figure 15:
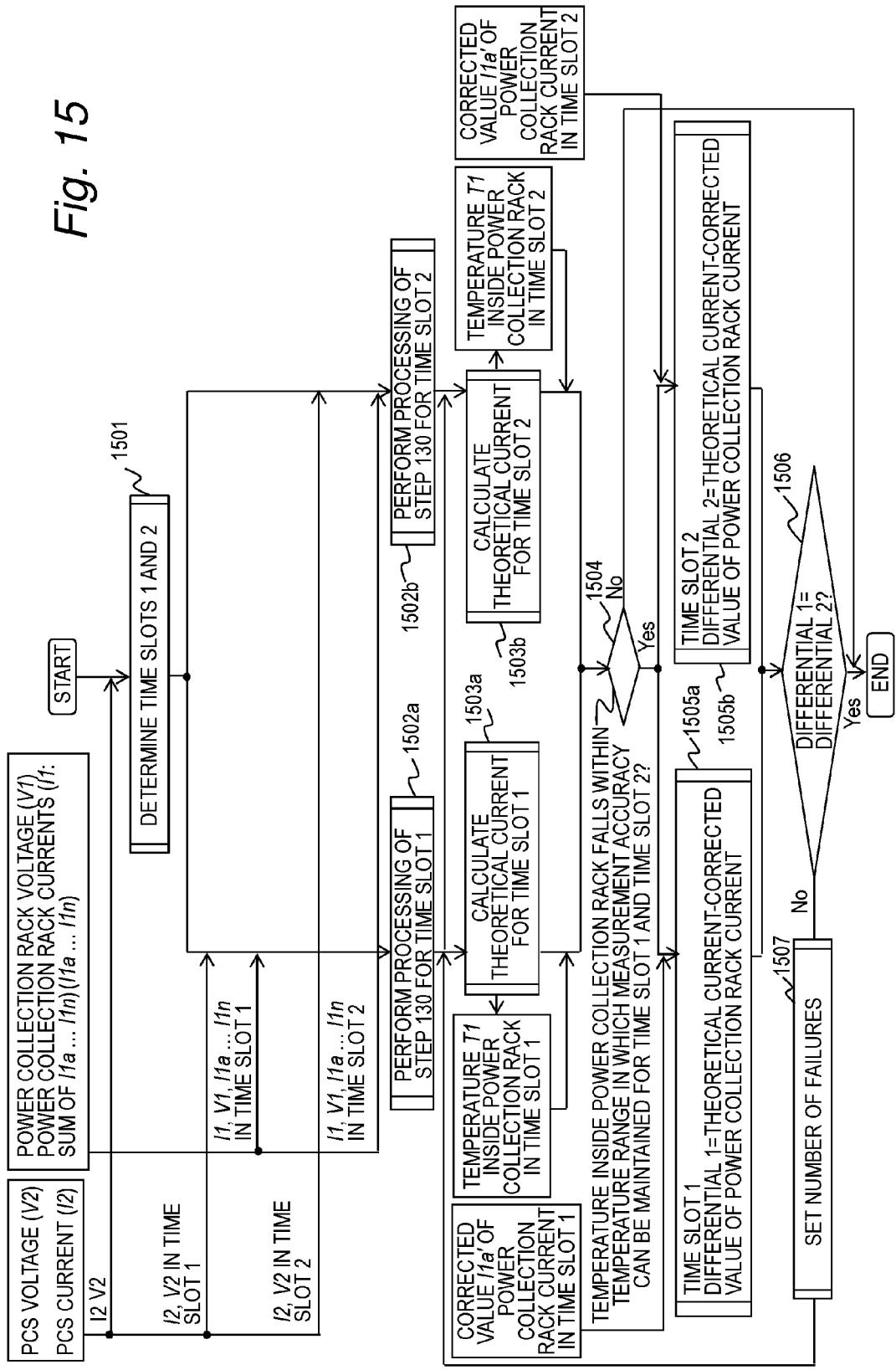
FIG. 15 is a flowchart for illustrating failure diagnosis processing executed by a monitoring apparatus according to the second embodiment of this invention.

FIG. 15 is a flowchart for illustrating failure diagnosis processing executed by the monitoring apparatus 6 according to the second embodiment of this invention.

First, the computing unit 6b determines two time slots (Step 1501). A case where the time slot 1 63a and the time slot 2 63b shown in FIG. 14A and FIG. 14B are determined is described below as an example.

The computing unit 6b uses the measurement values in the time slot 1 63a to perform the same processing as that of Step 103 including Step 101, Step 105, Step 121, and Step 122 illustrated in FIG. 13 (Step 1502a). Next, with the same method as that of Step 131 illustrated in FIG. 13, the theoretical current in the time slot 1 63a is calculated (Step 1503a).

Similarly, the computing unit 6b performs the same processing as that of Step 103 by using the measurement values in the time slot 2 63b (Step 1502b). Next, with the same method as that of Step 131, the computing unit 6b calculates the theoretical current in the time slot 2 63b (Step 1503b).

Next, the computing unit 6b determines whether or not the temperature inside the power collection rack 3 falls within a range in which the measurement accuracy can be maintained by the same method as that of Step 133 of FIG. 13 (Step 1504). When the temperature does not fall within the range in which the measurement accuracy can be maintained, the computing unit 6b terminates the processing.

When it is determined in Step 1504 that the temperature inside the power collection rack 3 falls within the range in which the measurement accuracy can be maintained, the computing unit 6b calculates a differential between the theoretical current calculated in Step 1503a and the corrected measured current calculated by Expression (3) (Step 1505a). More specifically, the computing unit 6b calculates the differential between the theoretical current flowing between the power collection rack 3 and each of the junction boxes 2 and a corresponding one of the corrected measured currents I1a' to I1n'. Similarly, the computing unit 6b calculates a differential between the theoretical current calculated in Step 1503b and the corrected measured current calculated by Expression (3) (Step 1505b). Those differentials correspond to offset values at the ordinary temperature. Therefore, the differential calculated from the measurement values for the time slot 1 63a and the differential calculated from the measurement values for the time slot 2 63b basically have the same value. For example, the differential between the corrected measured current I1a' and the theoretical current corresponding thereto are expected to have the same value regardless of whether the differential is calculated based on the measurement values for the time slot 1 63a or based on the measurement values for the time slot 2 63b. When the differentials are different, the reason is considered to be a value of Ncell used for the calculation being different from the number of photovoltaic cells 12a that are actually operating (specifically, not failed).

Thus, the computing unit 6b determines whether or not a differential 1 calculated in Step 1505a and a differential 2 calculated in Step 1505b are equal to each other (Step 1506). When the differential 1 and the differential 2 are not equal to each other, the value of Ncell in Expression (5) is changed (Step 1507) and the processing after Step 1502a and Step 1502b is repeatedly executed.

In a case where a difference between the differential 1 and the differential 2 satisfies a predetermined condition, for example, when the difference between the differential 1 and the differential 2 is smaller than a predetermined value or when the above-mentioned processing is repeated to minimize the difference between the differential 1 and the differential 2, the computing unit 6b may determine that the differential 1 and the differential 2 are equal to each other.

For example, when it is determined that the above-mentioned differential 1 and differential 2 calculated for the current bundled by one of the junction boxes 2 are equal to each other, the value of Ncell used for the calculation corresponds to the number of photovoltaic cells 12a coupled to the junction box 2 that are effective (specifically, not failed). Specifically, a difference between a total number of photovoltaic cells 12a coupled to the junction box 2 and Ncell corresponds to the number of failures, specifically, a loss. Therefore, the number of failures in the plurality of photovoltaic cell string groups bundled in each of the junction boxes 2 can be determined based on the value of Ncell when it is determined that the differential 1 and the differential 2 are equal to each other. When it is determined in Step 1506 that the difference between the differential 1 and the differential 2 satisfies the predetermined condition for one of the junction boxes 2, the computing unit 6b may output the number of failures calculated from the value of Ncell at that time.

Figure 16B:
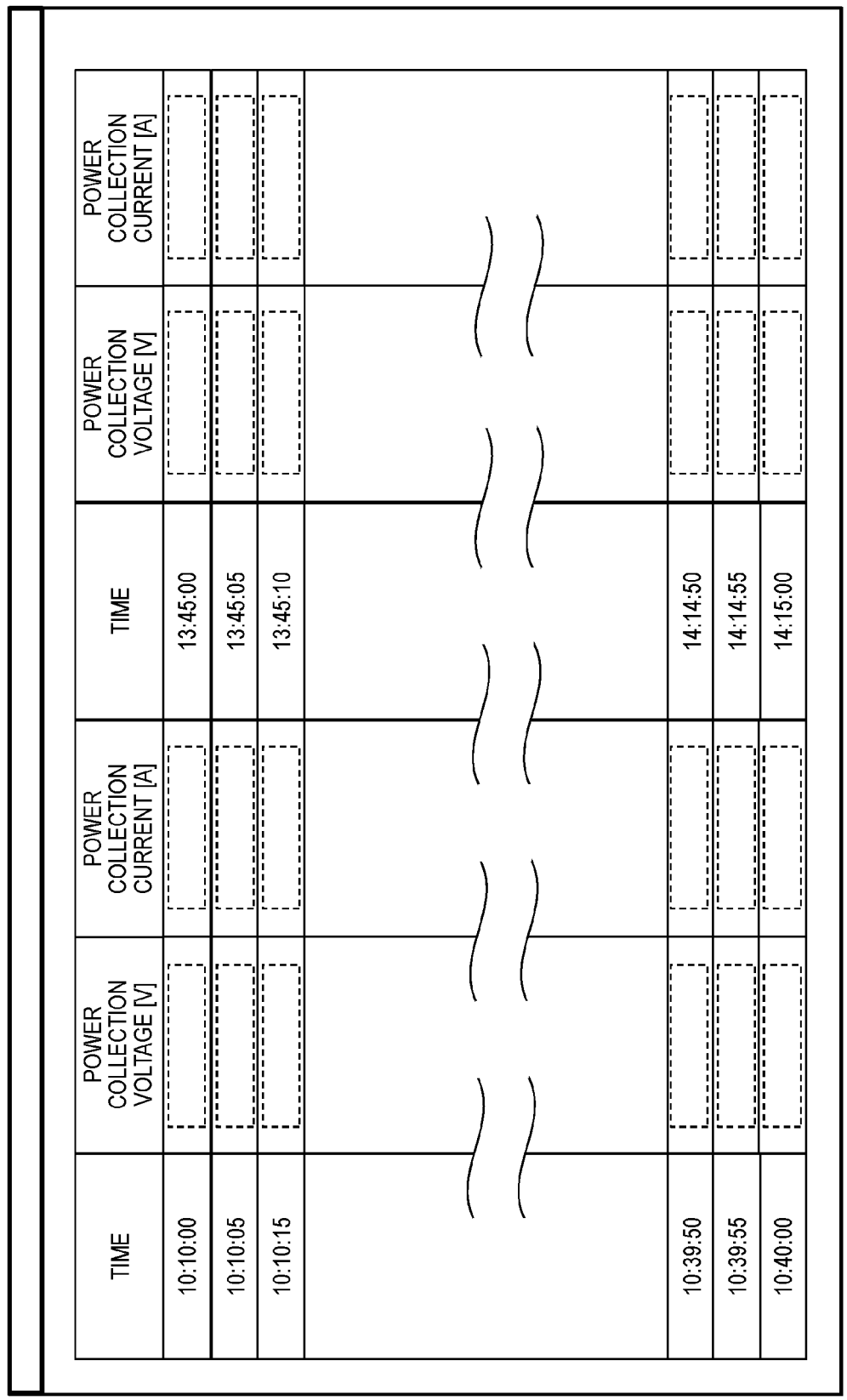

FIG. 16A and FIG. 16B are explanatory diagrams of an example of a screen displayed in the photovoltaic power generation system according to the second embodiment of this invention.

FIG. 16A is an example of display of a diagnosis result for each of the junction boxes 2 coupled to the power collection rack 3, which is displayed by the computing unit 6b of the monitoring apparatus 6 on the result display unit 6d. In this example, date and time of diagnosis (specifically, those of measurement of the voltage and the current to be diagnosed), the theoretical current calculated by the method described above, the measured current, and a failure loss calculated from the theoretical current and the measured current are displayed for each of the junction boxes 2. The failure loss may be, for example, a rate of decrease of the measured current with respect to the theoretical current for each of the junction boxes or may be a rate of the number of failures calculated by the processing illustrated in FIG. 15 for each junction box.

In this example, the screen further has a column to accept selection of "five-second data display" for each of the results of diagnosis. When an engineer operates (for example, clicks) the column, data of the voltage and the current for every five seconds in the time slot 1 and the time slot 2 used to obtain the results of diagnosis are displayed in parallel.

The computing unit 6b of the monitoring apparatus 6 according to the first embodiment can display the results of diagnosis illustrated in FIG. 16A and FIG. 16B on the result display unit 6d. In the first embodiment, however, when the "five-second data display" column is operated, data for every five seconds in the single time slot is displayed.

This invention is not limited to the embodiments described above, and encompasses various modification examples. For example, the embodiments have described this invention in detail for the ease of understanding, and this invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The components, functions, processing units, processing measures, and the like described above may be implemented partially or entirely by hardware by, for example, designing the components and the like as an integrated circuit. The components, functions, and the like described above may also be implemented by software by interpreting and executing, with a processor, programs that implement the respective functions. The programs, tables, files, and other types of information for implementing the functions can be stored in a computer-readable non-transitory data storage medium such as a non-volatile semiconductor memory, or a hard disk drive, a solid state drive (SSD), or other storage device, or an IC card, an SD card, a DVD, or the like.

Further, the control lines and information lines considered to be necessary for the description are illustrated. It is not necessarily the case that all the control lines and information lines necessary for a product are illustrated. In actual practice, almost all of the configurations may be considered as being coupled to each other.

What is claimed is:

1. A diagnosis system for a photovoltaic power generation system, comprising:
a power collection unit configured to couple a plurality of photovoltaic cell arrays, each including a plurality of photovoltaic cells, in parallel;
a control unit coupled to the power collection unit; and
a monitoring unit configured to diagnose the photovoltaic power generation system,
the control unit comprising:
a first current measurement apparatus configured to measure a current of the plurality of photovoltaic cell arrays input from the power collection unit; and
a first voltage measurement apparatus configured to measure a voltage of the plurality of photovoltaic cell arrays input from the power collection unit,
the control unit being configured to control a current and a voltage to be output so that power becomes maximum based on a current value measured by the first current measurement apparatus and a voltage value measured by the first voltage measurement apparatus, the power collection unit comprising a plurality of second current measurement apparatuses each respectively configured to measure currents of the plurality of photovoltaic cell arrays, the monitoring unit comprising:
  a storage unit configured to hold the current value measured by the first current measurement apparatus, the voltage value measured by the first voltage measurement apparatus, and current values measured by the plurality of second current measurement apparatuses; and
  a computing unit coupled to the storage unit, the computing unit being configured to:
  estimate a solar radiation amount and an operating temperature of the plurality of photovoltaic cell arrays based on the current value measured by the first current measurement apparatus and the voltage value measured by the first voltage measurement apparatus by using an expression expressing a relationship between the solar radiation amount, the operating temperature, and a number of photovoltaic cells, and an output current;
  correct the estimated solar radiation amount and the estimated operating temperature to values matching the current values measured by the plurality of second current measurement apparatuses based on the current value measured by the first current measurement apparatus and the current values measured by the plurality of second current measurement apparatuses by using the expression; and
  calculate a theoretical value of the current of each of the plurality of photovoltaic cell arrays based on the corrected solar radiation amount and the corrected operating temperature by using the expression.

2. The diagnosis system according to claim 1, wherein the computing unit is configured to correct the estimated solar radiation amount and the estimated operating temperature to the values matching the current values measured by the plurality of second current measurement apparatus based on the current value measured by the first current measurement apparatus and the current values measured by the plurality of second current measurement apparatuses so as to satisfy conditions that a ratio of a current at an operating point at which power becomes maximum and a short-circuit current is constant and that a gradient of a voltage with respect to a current at the operating point at which the power becomes maximum is constant.

3. The diagnosis system according to claim 2, wherein the computing unit is configured to:
  correct the current value measured by each of the plurality of second current measurement apparatuses so as to match linearity of the first current measurement apparatus and to cancel an offset between the current values measured by the plurality of second current measurement apparatuses and the current value measured by the first current measurement apparatus based on the sum of the current values measured by the plurality of second current measurement apparatuses, the current value measured by the first current measurement apparatus, and a specific value indicating a ratio of linearity of the each of the plurality of second current measurement apparatuses and the linearity of the first current measurement apparatus;
  correct the estimated solar radiation amount and the estimated operating temperature to the values matching the current values measured by the plurality of second current measurement apparatuses based on values obtained by correcting the current value measured by the first current measurement apparatus and the current values measured by the plurality of second current measurement apparatuses; and
  compare the theoretical value of the current of the each of the plurality of photovoltaic cell arrays and the value obtained by correcting the current value measured by each of the plurality of second current measurement apparatuses with each other.

4. The diagnosis system according to claim 3, wherein the computing unit is configured to:
  determine whether or not an ambient temperature of the plurality of second current measurement apparatuses, which is estimated based on temperature dependency of the plurality of second current measurement apparatuses, the sum of the current values measured by the plurality of second current measurement apparatuses, and the current value measured by the first current measurement apparatus, falls within a predetermined range in which desired measurement accuracy of the plurality of second current measurement apparatuses is maintainable;
  compare, when the estimated ambient temperature falls within the predetermined range, the theoretical value of the current of the each of the plurality of photovoltaic cell arrays and the value obtained by correcting the current value measured by the each of the plurality of second current measurement apparatuses with each other; and
  avoid, when the estimated ambient temperature does not fall within the predetermined range, comparing the theoretical value of the current of the each of the plurality of photovoltaic cell arrays and the value obtained by correcting the current value measured by each of the plurality of second current measurement apparatuses with each other.

5. The diagnosis system according to claim 3, wherein the computing unit is configured to:
  calculate, for the each of the plurality of photovoltaic cell arrays, a first differential between the theoretical value of the current of the each of the plurality of photovoltaic cell arrays and the value obtained by correcting the current value measured by each of the plurality of second current measurement apparatuses in a first time slot and a second differential between the theoretical value of the current of the each of the plurality of photovoltaic cell arrays and the value obtained by correcting the current value measured by each of the plurality of second current measurement apparatuses in a second time slot, the first time slot and the second time slot respectively having different solar radiation amounts, based on current values measured by the first current measurement apparatus in the first time slot and the second time slot, voltage values measured by the first voltage measurement apparatus in the first time slot and the second time slot, and values obtained by correcting current values measured by the plurality of second current measurement apparatuses in the first time slot and the second time slot; and
  estimate a number of failed photovoltaic cells in the each of the plurality of photovoltaic cell arrays based on a number of photovoltaic cells used for the calculation when a difference between the first differential and the second differential satisfies a predetermined condition.

6. The diagnosis system according to claim 1,
wherein the control unit is configured to control the current and the voltage so as to maximize the power by performing a switching operation at a predetermined frequency,
wherein the control unit comprises:
a first sampling processing unit configured to sample the current value measured by the first current measurement apparatus and the voltage value measured by the first voltage measurement apparatuses; and
a cooler configured to cool interior of the control unit including the first current measurement apparatus and the first voltage measurement apparatus,
wherein the power collection unit comprises a second sampling processing unit configured to sample the current value measured by each of the plurality of second current measurement apparatus, and
wherein the storage unit of the monitoring unit is configured to hold the current value and the voltage value sampled by the first sampling processing unit and the current value sampled by the second sampling processing unit.

7. The diagnosis system according to claim 1, wherein the each of the plurality of photovoltaic cell arrays comprises:
a plurality of photovoltaic cell strings each comprising a plurality of photovoltaic cells coupled in series; and
a coupling unit configured to couple the plurality of photovoltaic cell strings in parallel.

8. A diagnosis method for a photovoltaic power generation system, the photovoltaic power generation system comprising:
a plurality of photovoltaic cell arrays, each comprising a plurality of photovoltaic cells;
a power collection unit configured to couple the plurality of photovoltaic cell arrays in parallel;
a control unit coupled to the power collection unit; and
a monitoring unit configured to diagnose the photovoltaic power generation system, the control unit comprising:
a first current measurement apparatus configured to measure a current of the plurality of photovoltaic cell arrays input from the power collection unit; and
a first voltage measurement apparatus configured to measure a voltage of the plurality of photovoltaic cell arrays input from the power collection unit,
the control unit being configured to control a current and a voltage output so as to maximize power based on a current value measured by the first current measurement apparatus and a voltage value measured by the first voltage measurement apparatus,
the power collection unit comprising a plurality of second current measurement apparatuses each respectively configured to measure currents of the plurality of photovoltaic cell arrays,
the monitoring unit comprising:
a storage unit configured to store the current value measured by the first current measurement apparatus, the voltage value measured by the first voltage measurement apparatus, and current values measured by the plurality of second current measurement apparatuses; and
a computing unit coupled to the storage unit, the diagnosis method comprising:
a first procedure of estimating, by the computing unit, a solar radiation amount and an operating temperature of the plurality of photovoltaic cell arrays based on the current value measured by the first current measurement apparatus and the voltage value measured by the first voltage measurement apparatus by using an expression expressing a relationship between the solar radiation amount, the operating temperature, and a number of photovoltaic cells, and an output current;
a second procedure of correcting, by the computing unit, the estimated solar radiation amount and the estimated operating temperature to values matching the current values measured by the plurality of second current measurement apparatuses based on the current value measured by the first current measurement apparatus and the current values measured by the plurality of second current measurement apparatuses by using the expression; and
a third procedure of calculating, by the computing unit, a theoretical value of the current of each of the plurality of photovoltaic cell arrays based on the corrected solar radiation amount and the corrected operating temperature by using the expression.

9. The diagnosis method according to claim 8, wherein the second procedure comprises correcting, by the computing unit, the estimated solar radiation amount and the estimated operating temperature to the values matching the current values measured by the plurality of second current measurement apparatuses based on the current value measured by the first current measurement apparatus and the current values measured by the plurality of second measurement apparatuses so as to satisfy conditions that a ratio of a current at an operating point at which power becomes maximum and a short-circuit current is constant and that a gradient of a voltage with respect to a current at the operating point at which the power becomes maximum is constant.

10. The diagnosis method according to claim 9, further comprising:
a fourth procedure of correcting, by the computing unit, the current value measured by each of the plurality of second current measurement apparatuses so as to match linearity of the first current measurement apparatus and to cancel an offset between the current values measured by the plurality of second current measurement apparatuses and the current value measured by the first current measurement apparatus based on the sum of the current values measured by the plurality of second current measurement apparatuses, the current value measured by the first current measurement apparatus, and a specific value indicating a ratio of linearity of each of the plurality of second current measurement apparatuses and the linearity of the first current measurement apparatus; and
a fifth procedure of comparing, by the computing unit, the theoretical value of the current of the each of the plurality of photovoltaic cell arrays and a value obtained by correcting the current value measured by each of the plurality of second current measurement apparatuses with each other,
wherein the second procedure comprises correcting, by the computing unit, the estimated solar radiation amount and the estimated operating temperature to the values matching the current values measured by the plurality of second current measurement apparatuses based on values obtained by correcting the current value measured by the first current measurement apparatus and the current values measured by the plurality of second current measurement apparatuses.

11. The diagnosis method according to claim 10, further comprising, a sixth procedure of determining, by the computing unit, whether or not an ambient temperature of the plurality of second current measurement apparatuses, which is estimated based on temperature dependency of the plurality of second current measurement apparatuses, the sum of the current values measured by the plurality of second current measurement apparatuses, and the current value measured by the first current measurement apparatus, falls within a predetermined range in which desired measurement accuracy of the plurality of second current measurement apparatuses is maintainable, wherein the sixth procedure comprises executing the fifth procedure when the estimated ambient temperature falls within the predetermined range and avoiding executing the fifth procedure when the estimated ambient temperature does not fall within the predetermined range.

12. The diagnosis method according to claim 10, further comprising:
a sixth procedure of determining, by the computing unit, a first time slot and a second time slot respectively having different solar radiation amounts;
a seventh procedure of calculating, by the computing unit, for the each of the plurality of photovoltaic cell arrays, a first differential between the theoretical value of the current of the each of the plurality of photovoltaic cell arrays and the value obtained by correcting the current value measured by each of the plurality of second current measurement apparatuses in the first time slot based on a current value measured by the first current measurement apparatus in the first time slot, a voltage value measured by the first voltage measurement apparatus in the first time slot, and values obtained by correcting current values measured by the plurality of second current measurement apparatuses in the first time slot;
an eighth procedure of calculating, by the computing unit, for the each of the plurality of photovoltaic cell arrays, a second differential between the theoretical value of the current of the each of the plurality of photovoltaic cell arrays and the value obtained by correcting the current value measured by each of the plurality of second current measurement apparatuses in the second time slot based on a current value measured by the first current measurement apparatus in the second time slot, a voltage value measured by the first voltage measurement apparatus in the second time slot, and values obtained by correcting current values measured by the plurality of second current measurement apparatuses in the second time slot; and
a ninth procedure of estimating, by the computing unit, a number of failed photovoltaic cells in the each of the plurality of photovoltaic cell arrays based on a number of photovoltaic cells used for the calculation when a difference between the first differential and the second differential satisfies a predetermined condition.

13. The diagnosis method according to claim 8, further comprising controlling, by the control unit, the current and the voltage so as to maximize the power by performing a switching operation at a predetermined frequency,
wherein the control unit comprises:
a first sampling processing unit configured to sample the current value measured by the first current measurement apparatus and the voltage value measured by the first voltage measurement apparatus; and
a cooler configured to cool interior of the control unit including the first current measurement apparatus and the first voltage measurement apparatus,
wherein the power collection unit comprises a second sampling processing unit configured to sample the current value measured by each of the plurality of second current measurement apparatuses, and
wherein the storage unit of the monitoring unit is configured to hold the current value and the voltage value sampled by the first sampling processing unit and the current value sampled by the second sampling processing unit.

14. The diagnosis method according to claim 8, wherein the each of the plurality of photovoltaic cell arrays comprises:
a plurality of photovoltaic cell strings each comprising a plurality of photovoltaic cells coupled in series; and
a coupling unit configured to couple the plurality of photovoltaic cell strings in parallel.

* * * * *